United States Patent
Ohlsson et al.

(10) Patent No.: US 12,490,173 B2
(45) Date of Patent: Dec. 2, 2025

(54) NETWORK NODE, USER EQUIPMENT AND METHODS IN A RADIO COMMUNICATIONS NETWORK

(71) Applicant: Telefonaktiebolaget LM Ericsson (publ), Stockholm (SE)

(72) Inventors: Oscar Ohlsson, Bromma (SE); Pontus Wallentin, Linköping (SE); Andreas Höglund, Solna (SE); Olof Liberg, Enskede (SE); Paul Schliwa-Bertling, Ljungsbro (SE); Tuomas Tirronen, Helsinki (FI); Johan Bergman, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 264 days.

(21) Appl. No.: 17/918,238

(22) PCT Filed: Mar. 31, 2021

(86) PCT No.: PCT/SE2021/050289
§ 371 (c)(1),
(2) Date: Oct. 11, 2022

(87) PCT Pub. No.: WO2021/211033
PCT Pub. Date: Oct. 21, 2021

(65) Prior Publication Data
US 2023/0199618 A1 Jun. 22, 2023

Related U.S. Application Data

(60) Provisional application No. 63/009,488, filed on Apr. 14, 2020.

(51) Int. Cl.
*H04W 48/02* (2009.01)

(52) U.S. Cl.
CPC .................................. *H04W 48/02* (2013.01)

(58) Field of Classification Search
None
See application file for complete search history.

(56) References Cited

U.S. PATENT DOCUMENTS

| 2014/0079013 A1* | 3/2014 | Kim | H04W 74/0833 |
| | | | 370/329 |
| 2015/0140984 A1* | 5/2015 | Xu | H04W 8/22 |
| | | | 455/418 |

(Continued)

FOREIGN PATENT DOCUMENTS

WO  2018204609 A1  11/2018

OTHER PUBLICATIONS

3GPP, "3GPP TS 22.261 V16.10.0", Third Generation Partnership Project; Technical Specification Group Services and System Aspects; Service requirements for the 5G system; Stage 1 (Release 16), Dec. 2019, 1-72.

(Continued)

*Primary Examiner* — Hong S Cho
(74) *Attorney, Agent, or Firm* — Weisberg I.P. Law, P.A.

(57) ABSTRACT

A method performed by a network node, for controlling access of a first User Equipment (UE) and a second UE to a cell in a radio communications network is provided. The first UE is of a low complexity type, and wherein the second UE is of a regular type. A first association is assigned to the first UE. The first association associates the first UE with its low complexity type. A second association is assigned to the second UE. The second association associates the second UE with its regular type. The network node controls (302) access of the first UE and second UE by sending a rule to the first UE and second UE. The rule is related to access control that is different for UEs with different associations, for accessing to the radio communications network. The rule (Continued)

triggers the first UE to perform access barring check based on the first association and the obtained rule when initiating an access attempt to the cell, while the second UE performs access barring check based on the second association and the obtained rule.

22 Claims, 11 Drawing Sheets

(56) References Cited

U.S. PATENT DOCUMENTS

| | | | |
|---|---|---|---|
| 2017/0135024 A1* | 5/2017 | Burbidge | H04W 48/02 |
| 2019/0082376 A1* | 3/2019 | Hong | H04W 76/10 |
| 2019/0327663 A1 | 10/2019 | Wirth et al. | |
| 2019/0350035 A1* | 11/2019 | Kim | H04L 47/745 |
| 2024/0031909 A1* | 1/2024 | Yue | H04W 48/08 |

OTHER PUBLICATIONS

3GPP, "3GPP TS 24.501 V16.4.1", 3rd Generation Partnership Project; Technical Specification Group Core Network and Terminals; Non-Access-Stratum (NAS) protocol for 5G System (5GS); Stage 3; (Release 16), Mar. 2020, 1-666.

3GPP, "3rd Generation Partnership Project; Technical Specification Group Radio Access Network; NR; Medium Access Control (MAC) protocol specification (Release 15)", 3GPP TS 38.321 V15.8.0, Dec. 2019, 1-78.

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, 1-532.

Ericsson, "New SID on support of reduced capability NR devices", 3GPP TSG RAN Meeting #86, RP-193238, Sitges, Spain, Dec. 9-12, 2019, 1-5.

* cited by examiner

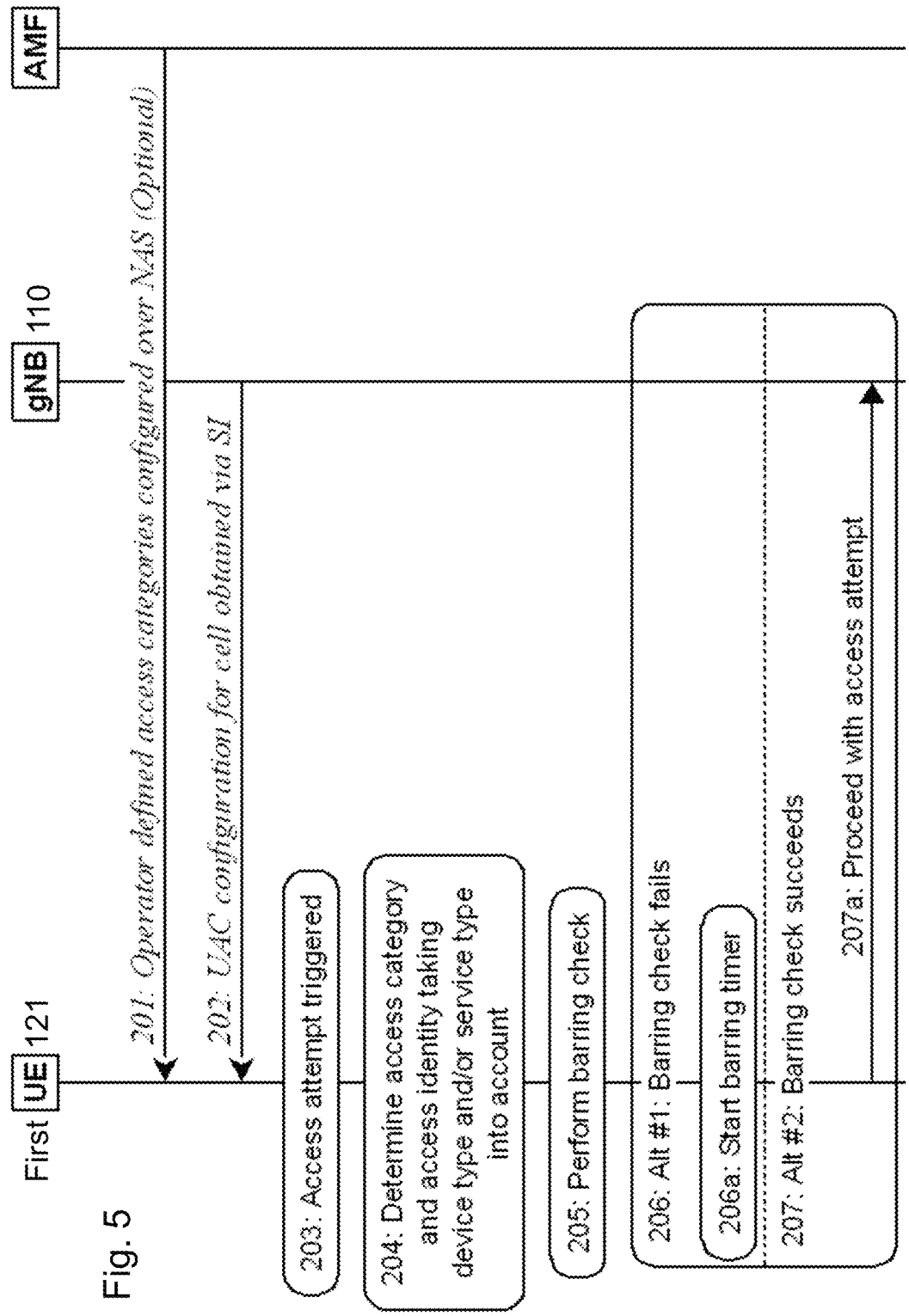

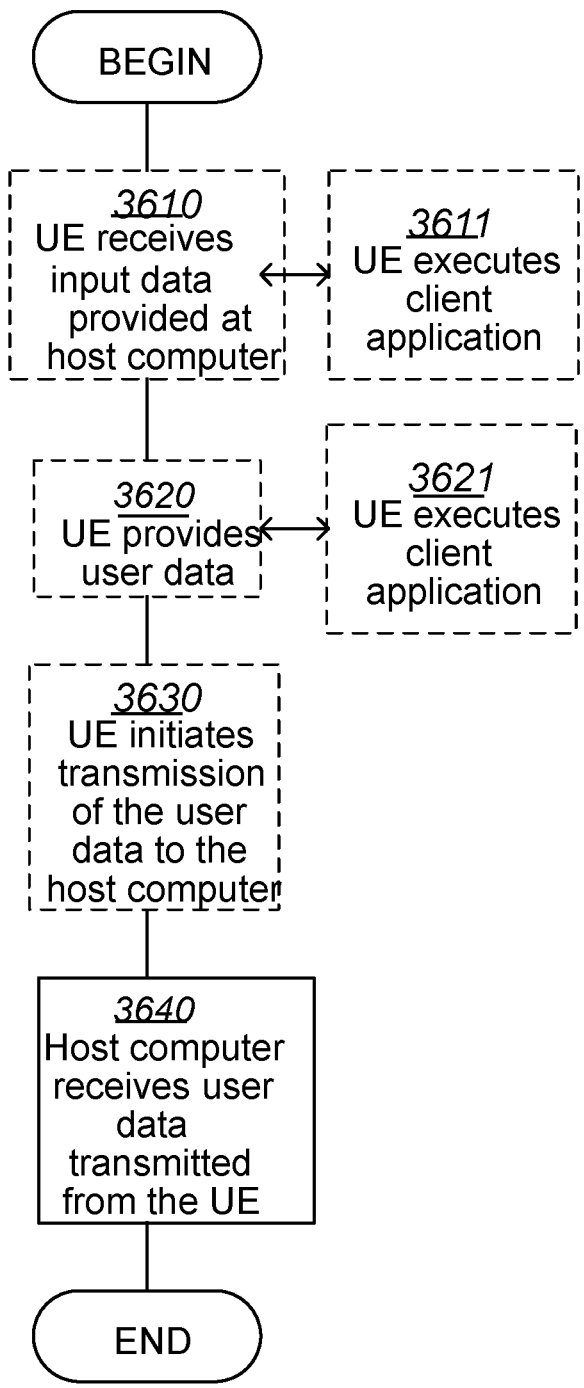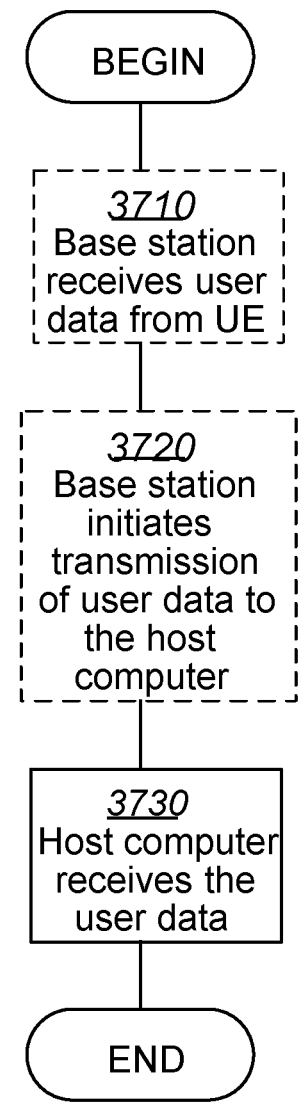
FIG 12
FIG 13

NETWORK NODE, USER EQUIPMENT AND METHODS IN A RADIO COMMUNICATIONS NETWORK

TECHNICAL FIELD

Embodiments herein relate to a network node, a first User Equipment (UE) and methods therein. In some aspects, they relate to controlling access of a first UE and a second UE to a cell in a radio communications network.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Reduced Capability NR Devices 5G is the fifth generation of cellular technology and was introduced in Release 15 of the 3GPP standard. It is designed to increase speed, reduce latency, and improve flexibility of wireless services. The 5G System (5GS) includes both a New Radio Access Network (NG-RAN) which makes use of a new air interface called New Radio (NR), and a new core network (5GC).

The initial release of 5G in Release 15 is optimized for Mobile Broadband (MBB) and Ultra-Reliable and Low Latency Communication (URLLC). These services require very high data rates and/or low latency and therefore put high requirements on the UE. To enable 5G to be used for other services with more relaxed performance requirements a new low complexity UE type is introduced in Release 17 see RP-193238, "New SID on support of reduced capability NR devices"). The low complexity UE type is particularly suited for Machine Type Communication (MTC) services such as wireless sensors or video surveillance, but it may also be used for MBB services with lower performance requirements such as wearables. A low complexity UE has reduced capabilities compared to a Release 15 NR UE, for instance:

Reduced UE bandwidth
Reduced number of UE RX/TX antennas
Half duplex FDD
Relaxed UE processing time
Relaxed UE processing capability Because of the reduced capabilities the low complexity UE is sometimes also referred to as an NR RedCap UE. An NR RedCap UE may have some or all of the reduced capabilities above.

From the operator side it is important that the low complexity UEs are only used for their intended use cases. To enforce this requirement the network must be able to identify the low complexity UEs and be able to restrict their access when necessary. This is captured in the 3GPP study item description for the low complexity UE (RP-193238, "New SID on support of reduced capability NR devices") as:

Study standardization framework and principles for how to define and constrain such reduced capabilities-considering definition of a limited set of one or more device types and considering how to ensure those device types are only used for the intended use cases.

Study functionality that will allow devices with reduced capabilities to be explicitly identifiable to networks and network operators, and allow operators to restrict their access, if desired.

Access Control Mechanisms in NR

Access control is used to prevent overload in wireless networks and ensure that high priority services, such as emergency calls, can gain access to the system also in times of congestion. In NR there are multiple access control mechanisms and which one to use depends on how severe a certain load situation is as illustrated in FIG. 1. FIG. 1 depicts an overview of access control mechanisms in NR.

During normal operation and light load, regular scheduling may be used to ensure that the QoS targets are met for UEs in a cell. At higher loads the network may decide to apply random access backoff or release/reject UEs with a wait timer. Access barring is typically applied as a last resort when the previous mechanisms are not enough to reduce the load.

Access Barring in NR

The main purpose of access barring is to redistribute the access requests of UEs through time to reduce the number of simultaneous access attempts. By applying different barring rates for low and high priority services it is also possible to ensure that the high priority services can access the system.

For LTE, several access barring mechanisms have been developed over the years, for example:

Access Class Barring (ACB) introduced in 3GPP Rel-8
Service Specific Access Control (SSAC) introduced in 3GPP Rel-9

Access control for Circuit-Switched Fallback (CSFB) introduced in 3GPP Rel-10.
Extended Access Barring (EAB) introduced in 3GPP Rel-11
ACB skip introduced in 3GPP Rel-12.
Application specific Congestion control for Data Communication (ACDC) introduced in 3GPP Rel-12
Access barring for NB-IoT, introduced in Rel-13.
RSRP-based (=coverage based) access barring for LTE-M and NB-IoT, introduced in 3GPP Release 15.

Early on in the NR standardization it was decided to unify the above access barring mechanisms into a single mechanism that may be adapted based on operator needs and that can address the same use cases. This mechanism is known as Unified Access Control (UAC).

In UAC each access attempt is categorized into an access category according to certain rules that are defined in the standard or configured by the operator, see 3GPP TS 24.501, NAS protocol for 5G System (5GS), v16.4.1. For each access category for which barring is applied, access barring information is broadcasted in system information (more specifically in SIB1) comprising a barring factor and a barring time. The UE draws a random number in the range 0-1 and if it is lower than the barring factor the access attempt is barred for a random time which depends on the barring time. In addition to the access category, each access attempt is also associated with one or more access identities which are used to allow certain types of UEs to bypass the access barring check for an access category. Normal UEs are mapped to access identity 0 while "special" UEs are mapped to access identities 1-6 (see TS 24.501, NAS protocol for 5G System (5GS), v16.4.1).

If a traffic load changes, the network may enable or disable access barring for one or more access categories by updating the access barring information broadcasted in SIB1. As for other types of system information changes, the base station may notify the UEs in a cell that the system information is updated by broadcasting an SI change indication in the cell. When a UE receives this indication it acquires and applies the updated system information. The UE may also regularly check for updates to system information by checking the value tag information broadcasted in SIB1.

The following excerpt from 3GPP TS 38.331, NR RRC protocol specification, v15.8.0 shows the access barring information which is broadcasted for each access category in SIB1. As can be seen the barring factor (uac-BarringFactor) ranges from 0, meaning that all access attempts are barred, to 0.95, meaning that 5 percent of the access attempts are barred, and the barring time (uac-BarringTime) ranges from 4s up to 512s. The access identities which are allowed to bypass the access check are indicated using a 7 bit bitmap (uac-BarringForAccessIdentity) in the broadcasted barring information. If any of the UE's access identities is set to 0 in the bitmap, the access barring check is skipped for the access category and the UE is allowed to proceed with the access attempt.

| UAC-BarringInfoSetList information element |
|---|

```
-- ASN1START
-- TAG-UAC-BARRINGINFOSETLIST-START
UAC-BarringInfoSetList ::=         SEQUENCE (SIZE (1..maxBarringInfoBet)) OF
UAC-BarringInfoSet
UAC-Barring InfoSat :: =           SEQUENCE {
    uac-BarringFactor                  ENUMERATED    (p00, p05, p10, p15, p20,
                                                     p25, p30, p40, p50, p60,
                                                     p70, p75, p80, p85, p90,
                                                     p95},
    uac-BarringTime                    ENUMERATED    (s4, s8,s16, s32, s64,
                                                     s128, s256, s512},
    uac-BarringForAccessIdentity       BIT STRING (SIZE (7))
}
-- TAG-UAC-BARRINGINFOSETLIST-STOP
-- ASN1STOP
```

One notable difference between LTE and NR is that UAC is applicable to all UE states (RRC_IDLE, RRC_INACTIVE, and RRC_CONNECTED), whereas the access barring mechanisms in LTE are only applicable to UEs in RRC_IDLE.

Standardized Vs Operator Defined Access Categories

The mapping between access attempts and access categories in UAC are shown in Table 1 below copied from 3GPP TS 24.501, NAS protocol for 5G System (5GS), v16.4.1. UAC and access categories are defined in 3GPP TS 22.261, Service requirements for the 5G system, v16.10.0, clause 6.22. In total there are 64 access categories available in UAC where access categories 0-31 are standardized, and access categories 32-63 are operator defined. The mapping rules for the standardized access categories are pre-defined in the standard while the mapping rules for the operator defined are signaled to the UE using NAS signaling. Note that currently (TS 22.261, Service requirements for the 5G system, v16.10.0) only the first 11 standardized access categories have been defined; the rest are reserved for future use.

TABLE 1

Mapping between access attempts and access categories (from 3GPP TS 24.501, NAS protocol for 5G System (5GS), v16.4.1):

| Rule # | Type of access attempt | Requirements to be met | Access Category |
|---|---|---|---|
| 1 | Response to paging or NOTIFICATION over non-3GPP access; 5GMM connection management procedure initiated for the purpose of transporting an LPP message without an ongoing 5GC-MO-LR procedure; Access attempt to handover of ongoing MMTEL voice call, MMTEL video call or SMSolP from non-3GPP access | Access attempt is for MT access, or handover of ongoing MMTEL voice call, MMTEL video call or SMSolP from non-3GPP access | 0 (= MT_acc) |
| 2 | Emergency | UE is attempting access for an emergency session (NOTE 1, NOTE 2) | 2 (= emergency) |
| 3 | Access attempt for operator-defined access category | UE stores operator-defined access category definitions valid in the current PLMN as specified in subclause 4.5.3, and access attempt is matching criteria of an operator-defined access category definition | 32-63 (= based on operator classification) |
| 3.1 | Access attempt for MO exception data | UE is in NB-N1 mode and allowed to use exception data reporting (see the ExceptionDataReportingAllowed leaf of the NAS configuration MO in 3GPP TS 24.368 [17] or the USIM file EF$_{NASCONFIG}$ In 3GPP TS 31.102 [22]), and access attempt is for MO data or for MO signalling initiated upon receiving a request from upper layers to transmit user data related to an exceptional event. | 10 (= MO exceplion data) |
| 4 | Access attempt for delay tolerant service | (a) UE is configured for NAS signalling low priority or UE supporting S1 mode is configured for EAB (see the "ExtendedAccessBarring" leaf of NAS configuration MO in 3GPP TS 24.368 [17] or 3GPP TS 31.102 [22]) where "EAB override" does not apply, and (b): the UE received one of the categories a, b or c as part of the parameters for unified access control in the broadcast system information, and the UE is a member of the broadcasted category in the selected PLMN or RPLMN/equivalent PLMN (NOTE 3, NOTE 5, NOTE 6, NOTE 7, NOTE 8) | 1 (= delay tolerant) |
| 4.1 | MO IMS registration related signalling | Access attempt is for MO IMS registration related signalling (e.g. IMS initial registration, re-registration, subscription refresh) or for NAS signalling connection recovery during ongoing procedure for MO IMS registration related signalling (NOTE 2a) | 9 (= MO IMS registration related signalling) |
| 5 | MO MMTel voice call | Access attempt is for MO MMTel voice call or for NAS signalling connection recovery during ongoing MO MMTel voice call (NOTE 2) | 4 (= MO MMTel voice) |
| 6 | MO MMTel video call | Access attempt is for MO MMTel video call or for NAS signalling connection recovery during ongoing MO MMTel video call (NOTE 2) | 5 (= MO MMTel video) |

TABLE 1-continued

Mapping between access attempts and access categories (from 3GPP TS 24.501, NAS protocol for 5G System (5GS), v16.4.1):

| Rule # | Type of access attempt | Requirements to be met | Access Category |
|---|---|---|---|
| 7 | MO SMS over NAS or MO SMSoIP | Access attempt is for MO SMS over NAS (NOTE 4) or MO SMS over SMSoIP transfer or for NAS signalling connection recovery during ongoing MO SMS or SMSoIP transfer (NOTE 2) | 6 (= MO SMS and SMSoIP) |
| 8 | UE NAS initiated 5GMM specific procedures | Access attempt is for MO signalling | 3 (= MO_sig) |
| 8.1 | Mobile originated location request | Access attempt is for mobile originated location request (NOTE 9) | 3 (= MO_sig) |
| 8.2 | Mobile originated signalling transaction towards the PCF | Access attempt is for mobile PCF (NOTE 10) | 3 (= MO_sig) |
| 9 | UE NAS Initiated 5GMM connection management procedure or 5GMM NAS transport procedure | Access attempt is for MO data | 7 (= MO_data) |
| 10 | An uplink user data packet is to be sent for a PDU session with suspended user-plane resources | No further requirement is to be met | 7 (= MO_data) |

NOTE 1: This includes 5GMM specific procedures while the service is ongoing and 5GMM connection management procedures required to establish a PDU session with request type="initial emergency request" or "existing emergency PDU session", or to re-establish user-plane resources for such a PDU session. This further includes the service request procedure initiated with a SERVICE REQUEST message with the Service type IE set to "emergency services fallback".

NOTE 2: Access for the purpose of NAS signalling connection recovery during an ongoing service as defined in subclause 4.5.5, or for the purpose of NAS signalling connection establishment following fallback indication from lower layers during an ongoing service as defined in subclause 4.5.5, is mapped to the access category of the ongoing service in order to derive an RRC establishment cause, but barring checks will be skipped for this access attempt.

NOTE 2a: Access for the purpose of NAS signalling connection recovery during an ongoing procedure for MO IMS registration related signalling as defined in subclause 4.5.5, or for the purpose of NAS signalling connection establishment following fallback indication from lower layers during an ongoing procedure for MO IMS registration related signalling as defined in subclause 4.5.5, is mapped to the access category of the MO IMS registration related signalling in order to derive an RRC establishment cause, but barring checks will be skipped for this access attempt.

NOTE 3: If the UE selects a new PLMN, then the selected PLMN is used to check the membership; otherwise the UE uses the RLPMN or a PLMN equivalent to the RPLMN.

NOTE 4: This includes the 5GMM connection management procedures triggered by the UE-initiated NAS transport procedure for transporting the MO SMS.

NOTE 5: The UE configured for NAS signalling low priority is not supported in this release of specification. If a UE supporting both S1 mode and N1 mode is configured for NAS signalling low priority in S1 mode as specified in 3GPP TS 24.368 or 3GPP TS 31.102 [22], the UE shall ignore the configuration for NAS signalling low priority when in N1 mode.

NOTE 6: If the access category applicable for the access attempt is 1, then the UE shall additionally determine a second access category from the range 3 to 7. If more than one access category matches, the access category of the lowest rule number shall be chosen. The UE shall use the second access category only to derive an RRC establishment cause for the access attempt.

NOTE 7: "EAB override" does not apply, if the UE is not configured to allow overriding EAB (see the "Override_ExtendedAccessBarring" leaf of NAS configuration MO in 3GPP TS 24.368 or 3GPP TS 31.102 [22]), or if NAS has not received an indication from the upper layers to override EAB and the UE does not have a PDU session that was established with EAB override.

NOTE 8: For the definition of categories a, b and c associated with access category 1, see 3GPP TS 22.261 [3]. The categories associated with access category 1 are distinct from the categories a, b and c associated with EAB (see 3GPP TS 22.011 [1A]).

NOTE 9: This includes:
a) the UE-initiated NAS transport procedure for transporting a mobile originated location request;
b) the 5GMM connection management procedure triggered by a) above; and
c) NAS signalling connection recovery during an ongoing 5GC-MO-LR procedure.

NOTE 10: This includes:
a) the UE-initiated NAS transport procedure for transporting a mobile originated signalling transaction towards the PCF;
b) the 5GMM connection management procedure triggered by a) above;
and
c) NAS signalling connection recovery during an ongoing UE triggered V2X policy provisioning procedure.

For the operator defined access categories, the mapping from access attempt to access category is done by matching the access attempt to one or more criteria. The mapping rules including the criterias are signaled to the UE over NAS when the operator defined access category is configured in the UE. Currently the following criterias have been defined in TS 24.501, NAS protocol for 5G System (5GS), v16.4.1:
Data Network Name (DNN)
    DNN is the name of the gateway between the 5G network and the other data network (e.g. Internet). To fullfil the criteria the access attempt must be triggered by a PDU session whose DNN matches the signaled value.
5G QoS Identifier (5QI)
    5QI indicates the QoS forwarding behaviour (e.g. packet loss rate, packet delay budget) to be provided to a 5G QoS Flow. To fullfil the criteria the access attempt must be triggered by a QoS flow whose 5QI matches the signaled value.
OS Id+OS App Id
    To fullfil this criteria the access attempt must be triggered by an application whose OS Id+OS App Id matches the signaled value.
Single Network Slice Selection Assistance Information (S-NSSAI)
    S-NSSAI identifies a particular network slice. To fullfil the criteria the access attempt must be triggered by a network slice whose S-NSSAI matches the signaled value.

SUMMARY

As a part of developing embodiments herein the inventors identified a problem which first will be discussed.

A problem is how to identify and authorize UEs with reduced capabilities in a network and also to restrict access also for the UEs which are authorized to use reduced capabilities. For example, in case of an overload situation like radio resource congestion or shortage of processing capabilities, a network may wish to reduce overload by denying access to a cell for the low complexity UEs. The wordings "a UE with reduced capabilities" and "a low complexity UE" are similar and are used interchangeably in this document. The network may also need to prioritize between normal complexity and low complexity UEs during overload situations. To this end, the network may employ what is in 3GPP referred to as access control.

However, currently it is not possible to apply differentiated access control for low complexity and regular UEs.

An object of embodiments herein is therefore to improve the performance of a wireless communications network in which low complexity UEs are operating.

According to an aspect of embodiments herein, the object is achieved by a method performed by a network node, for controlling access of a first User Equipment, UE, and a second UE to a cell in a radio communications network. The first UE is of a low complexity type, and the second UE is of a regular type. A first association is assigned to the first UE. The first association associates the first UE with its low complexity type. A second association is assigned to the second UE. The second association associates the second UE with its regular type. The network node controls access of the first UE and second UE by sending a rule to the first UE and second UE. The rule is related to access control that is different for UEs with different associations, for accessing to the radio communications network. The rule triggers the first UE to perform access barring check based on the first association and the obtained rule when initiating an access attempt to the cell, while the second UE performs access barring check based on the second association and the obtained rule.

According to another aspect of embodiments herein, the object is achieved by a method performed by a first User Equipment, UE, for handling access to a cell in a radio communications network. The first UE is of a low complexity type. The first UE obtains a first association assigned to the first UE. The association associates the first UE with low complexity type. The first UE further obtains a rule—The rule is related to access control for UEs with different associations for accessing to the radio communications network. When initiating an access attempt to the cell, performing access barring check based on the first association and the obtained rule.

According to another aspect of embodiments herein, the object is achieved by a network node configured to control access of a first User Equipment, UE, and a second UE to a cell in a radio communications network. The first UE is adapted to be of a low complexity type, and the second UE is adapted to be of a regular type. A first association is adapted to be assigned to the first UE. The first association is further adapted to associate the first UE with its low complexity type. A second association is adapted to be assigned to the second UE. The second association is further adapted to associate the second UE with its regular type. The network node is further configured to control access of the first UE and second UE by sending a rule to the first UE and second UE. The rule adapted to relate to access control that is different for UEs with different associations, for accessing to the radio communications network. The rule is further adapted to trigger the first UE to perform access barring check based on the first association and the obtained rule when initiating an access attempt to the cell, while the second UE performs access barring check based on the second association and the obtained rule.

According to another aspect of embodiments herein, the object is achieved by a first User Equipment, UE, configured to handle access to a cell in a radio communications network. The first UE is of a low complexity type. The first UE is further configured to:
    Obtain a first association, assigned to the first UE, which association is adapted to associates the first UE with low complexity type,
    obtain a rule related to access control for UEs with different associations for access to the radio communications network, and
    when initiating an access attempt to the cell perform access barring check based on the first association and the obtained rule.

It is furthermore provided herein a computer program product comprising instructions, which, when executed on at least one processor, cause the at least one processor to carry out any of the methods above, as performed by the apparatus. It is additionally provided herein a computer-readable storage medium, having stored there on a computer program product comprising instructions which, when executed on at least one processor, cause the at least one processor to carry out the method according to any of the methods above, as performed by any one or more out of the network node and the first UE.

BRIEF DESCRIPTION OF THE DRAWINGS

Examples of embodiments herein are described in more detail with reference to attached drawings in which.

FIG. 5 is a sequence diagram depicting embodiments of a method.

FIGS. 10-13 are flowcharts illustrating methods implemented in a communication system including a host computer, a base station and a user equipment.

DETAILED DESCRIPTION

Some embodiments herein relate to access control for low complexity UEs such as e.g. reduced capability NR devices.

To address the problem above the low complexity UEs are assigned a different access category or different access identities than the regular UEs. The different access categories and/or access identities in some embodiments, allow the network to set different barring rates for low complexity UEs and regular UEs and hence it is possible to prioritize one group over the other. Another alternative is to broadcast separate UAC configuration for the low complexity UEs in SIB1.

As an alternative or complement to the above, the low complexity UE may also be rate controlled by differentiating the low complexity UEs in the random access procedure and/or during RRC connection establishment.

Embodiments herein enable the network to control the load, i.e. the amount of traffic and signaling, generated by the low complexity UEs. This is useful, for example, if the network needs to prioritize the regular UEs (which use e.g. MBB and URLLC applications) over the low complexity UEs (which use e.g. MTC applications) in overload situations.

Figure 1:
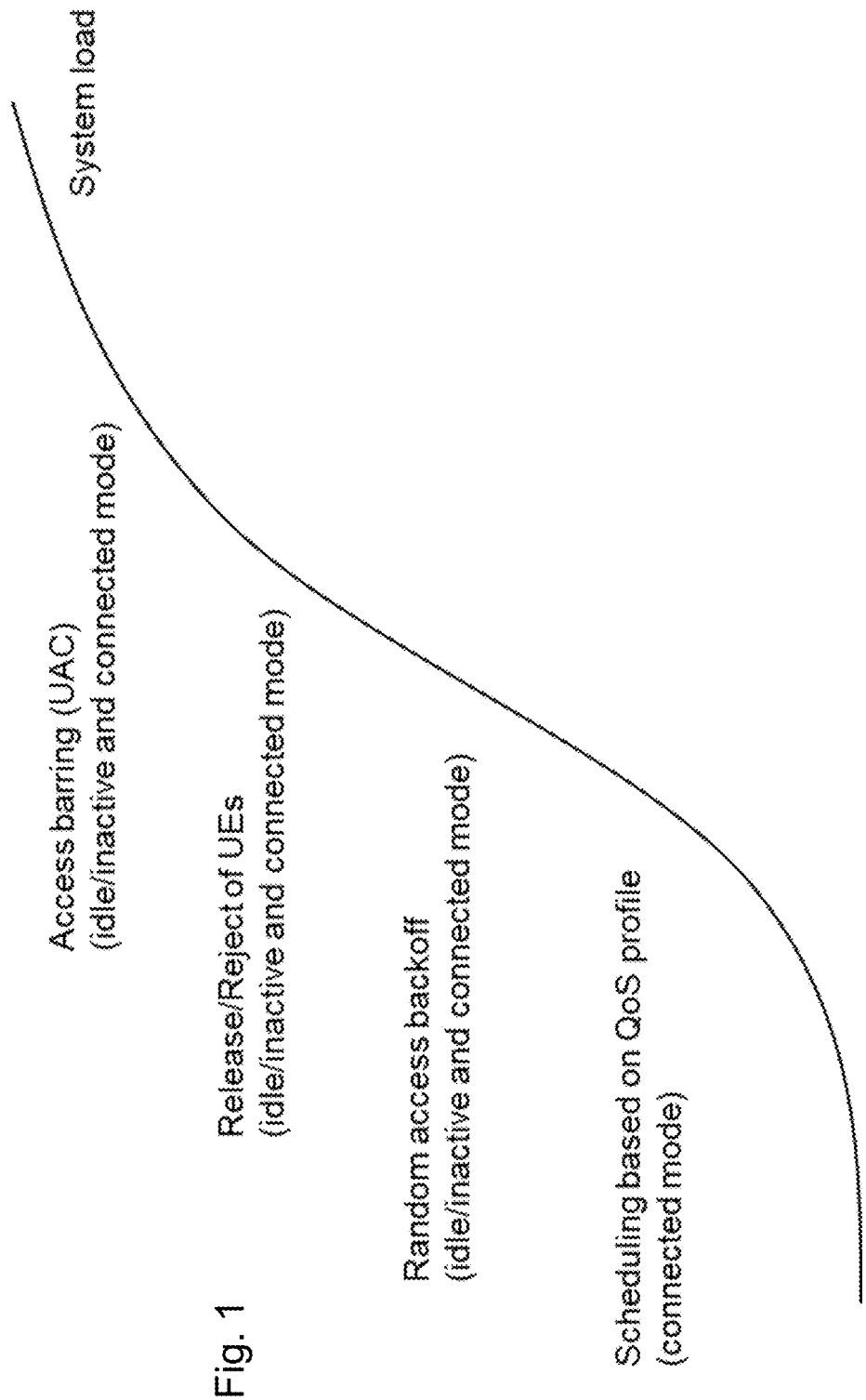
FIG. 1 is a schematic block diagrams illustrating prior art.
Figure 2:
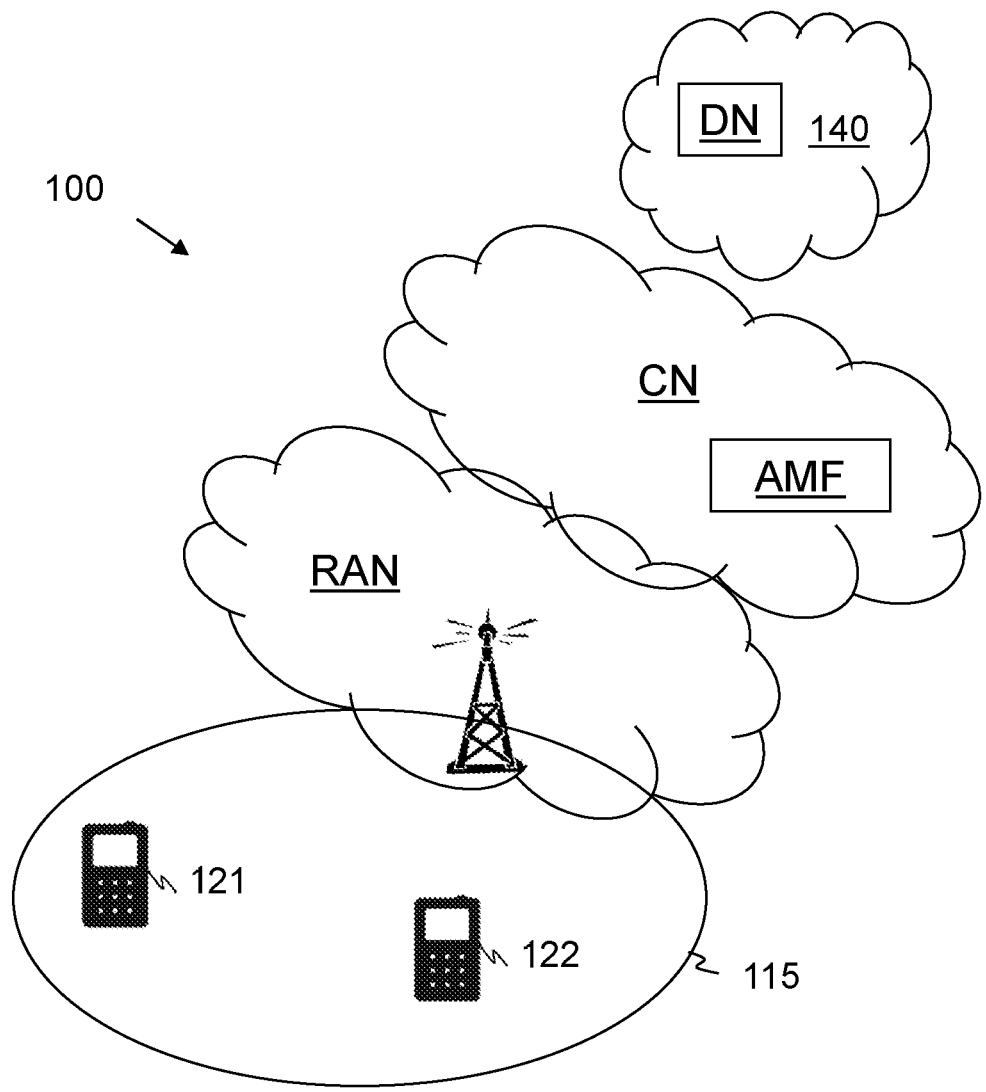
FIG. 2 is a schematic block diagram illustrating embodiments of a radio communications network.

FIG. 2 is a schematic overview depicting a radio communications network 100 wherein embodiments herein may be implemented. The radio communications network 100 comprises one or more RANs and one or more CNs. The radio communications network 100 may use 5G NR but may further use a number of other different technologies, such as, Wi-Fi, (LTE), LTE-Advanced, Wideband Code Division Multiple Access (WCDMA), Global System for Mobile communications/enhanced Data rate for GSM Evolution (GSM/EDGE), or Ultra Mobile Broadband (UMB), just to mention a few possible implementations.

Network nodes such as a network node 110 operate in the radio communications network 100. The network node 110 e.g. provides a number of cells such as cell 115, and may use these cells for communicating with e.g. a first UE 121 and a second UE 122. The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within any of cell1 and cell2 served by the network node 110 depending e.g. on the radio access technology and terminology used. The network node may also be represented by a CN node, e.g. an AMF node.

Different UEs operate in the radio communications network 100, such as a first UE 121, and a second UE 122.

The first UE 121 may e.g. be an NR device, a mobile station, a wireless terminal, an NB-IoT device, an eMTC device, an NR RedCap device, a CAT-M device, a WiFi device, an LTE device and an a non-access point (non-AP) STA, a STA, that communicates via a base station such as e.g. the network node 110, one or more Access Networks (AN), e.g. RAN, to one or more core networks (CN). The first UE 121 is of a low complexity type e.g. using reduced capabilities for communication in the radio communications network 100, such as e.g. an MTC device, V2X device, an MBB device.

The second UE 122 is a regular UE using ordinary capabilities for communication in the radio communications network 100, such as e.g. an NR device, a mobile station, a wireless terminal, an NB-IoT device, a WiFi device, an LTE device and an a non-access point (non-AP) STA, a STA, that communicates via a base station such as e.g. the network node 110, one or more Access Networks (AN), e.g. RAN, to one or more core networks (CN).

The second UE 122 is not a low complexity type UE but a regular UE, also referred to as an ordinary UE, e.g. using MBB and URLLC applications. The second UE 122 may be capable of using services that require very high data rates and/or low latency and therefore puts high requirements on the UE.

It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

CN nodes operate in the radio communications network 100. The CN node may e.g. be an AMF node or an SMF node.

Methods herein may in one aspect be performed by the network node 110, in another aspect by the first UE 121. As an alternative, a Distributed Node (DN) and functionality, e.g. comprised in a cloud 140 as shown in FIG. 2, may be used for performing or partly performing the methods.

To allow the network such as the radio communications network 100 in some embodiments to apply differentiated access barring for low complexity, UEs such as the first UE 121 and regular UEs such as the second UE 122, the low complexity UEs are assigned a separate access category in some embodiments and/or access identity in some other embodiments. According to some further embodiments, a separate UAC configuration is broadcasted for the low complexity UEs in SI.

As an alternative or complement to the above, the low complexity UE may also be rate controlled by differentiating the low complexity UEs in the random access procedure and/or in the RRC connection setup/resume procedure.

Figure 3:
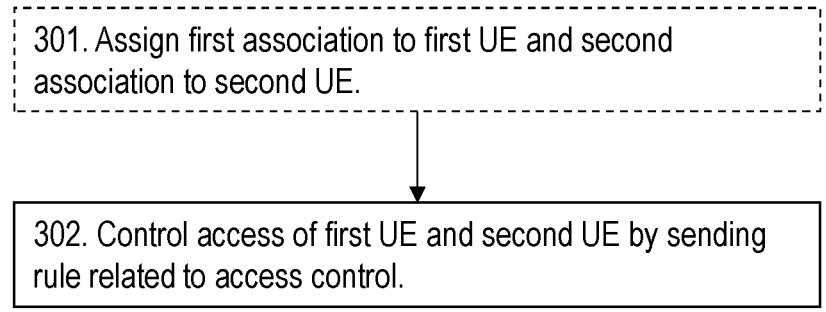
FIG. 3 is a flowchart depicting embodiments of a method in a network node.

FIG. 3 shows an example method performed by the network node 110, e.g. for controlling access of the first UE 121 and the second UE 122 to the radio communications network 100.

As mentioned above, the first UE 121 is of a low complexity type, e.g. using reduced capabilities. The reduced capabilities relate to reduced capabilities for communication in the radio communications network 100. The first UE 121 may e.g. be an MTC device, an V2X device, an MBB device, or any other low complexity type UE, see also text above. The second UE 122 is of a regular type.

Action 301

In some embodiments, the network node 110 assigns:

A first association to the first UE 121. The first association associates the first UE 121 with its low complexity type. The first association may e.g. be anyone out of: an access category, an access identity, a low complexity type indication.

A second association is assigned to the second UE 122. The second association associates the second UE 122 with its regular type. The second association may e.g. be anyone out of: one or more access categories, an access identity, and a regular type indication.

A first association is assigned to the first UE 121. The first association associates the first UE 121 with its low complexity type. The first association may e.g. be anyone out of: an access category, a service type, an access identity, a low complexity type indication. A second association is assigned to the second UE 122. The second association associates the second UE 122 with its regular type. The second association is e.g. anyone out of: one or more access categories, an access identity, a regular type indication. The method comprises any one or more out of the actions below.

Action 302

The network node 110 controls access of the first UE 121 and second UE 122. This is performed by sending a rule to the first UE 121 and second UE 122. The rule may e.g. be one or more e.g. a configurations. The rule is related to access control that is different for UEs with different associations e.g. low complexity first UEs 121 and regular second UEs 122, for accessing to the radio communications network 100.

This means that the network such as the network node 110 can control access for UEs with different associations for accessing a cell. E.g. such that low complexity first UEs such as the first UE 121 performs access barring check according to harder rules than regular second UEs such as the second UE 122. Or e.g. such that low complexity first UEs such as the first UE 121 performs access barring check and regular second UEs such as the second UE 122 do not. So, the first UE 121 will know from the rule and its type if or how to perform an access barring check. There may also be cases where the opposite is wanted, i.e. apply more loose rules for the low complexity/MTC UEs such as the first UE 121, than the regular UEs such as the second UE 122.

Thus the rule triggers the first UE 121 to perform access barring check based on the first association and the obtained rule when initiating an access attempt to a cell, e.g. in the radio communications network 100, while the second UE 122 performs access barring check based on the second association and the obtained rule.

For example, in case of an overload situation like radio resource congestion or shortage of processing capabilities, a network such as the network node 110 may wish to reduce overload by denying access to the cell for the low complexity UEs such as the first UE 122. The network such as the network node 110 may also need to prioritize between normal complexity such as the second UE 122 and low complexity UEs during overload situations. Thus in some embodiments, the rule is sent to the first UE 121 and second UE 122 when any one or more out of:

The radio communications network 100 is overloaded, when needed to prioritize an regular second UE 122 which e.g. uses MBB and URLLC applications, over the low complexity first UE 121 which e.g. uses MTC applications, and when the amount of traffic and signaling, generated by the low complexity UEs need to be barred.

The rule related to access control that is different for UEs with different associations may comprise any one out of:

A separate access category to be used by the low complexity first UE 121 for the access barring check, and another access category to be used by the regular second UE 122 for the access barring check, referred to as first embodiments below.

A separate access identity to be used by the low complexity first UE 121 for the access barring check, and another access identity to be used by the regular second UE 122 for the access barring check, referred to as second embodiments below.

A separate UAC configuration e.g. in SIB1 or in some other SIB, associated to and/or to be read by, the low complexity first UE 121 and another UAC configuration e.g. in in SIB1, associated to and/or to be read by the regular second UE 122, referred to as third embodiments below.

Figure 4:
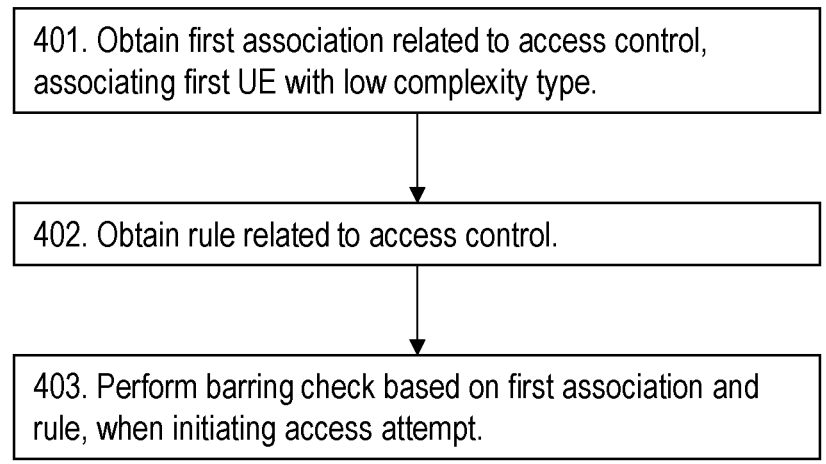
FIG. 4 is a flowchart depicting embodiments of a method in a first UE.

FIG. 4 shows an example method performed by the first UE 121, e.g. for handling access to a radio communications network 100. The first UE 121 is of a low complexity type. The first UE 121 is e.g. using reduced capabilities. The reduced capabilities may relate to reduced capabilities for communication in the radio communications network 100. The first UE 121 may e.g. be an MTC device, a V2X device, an MBB device.

The method comprises any one or more out of the actions below:

Action 401

The first UE 121 obtains a first association assigned to the first UE 121. The association associates the first UE 121 with low complexity type. The association may e.g. be any one out of: an access category, an access identity, a low complexity type indication.

Action 402

The first UE 121 obtains a rule related to access control for UEs with different associations for accessing a cell in the radio communications network 100. The rule is different for different type of UEs such as e.g. low complexity first UEs such as the first UE 121 and regular second UEs such as the second UE 122.

This means that the network such as the network node 110 may control access for UEs with different associations for accessing a cell. E.g. such that low complexity first UEs such as the first UE 121 performs access barring check according to harder rules than regular second UEs such as the second UE 122. Or e.g. such that low complexity first UEs such as the first UE 121 performs access barring check and regular second UEs such as the second UE 122 do not. So, the first UE 121 will know from the rule and its type if or how to perform an access barring check.

E.g., according to the reason mentioned above, the rule may e.g. be obtained when any one or more out of:

The radio communications network 100 is overloaded, when needed to prioritize a regular second UE 122 which e.g. uses MBB and URLLC applications, over the low complexity first UE 121 which e.g. uses MTC applications, when the amount of traffic and signaling, generated by the low complexity UEs need to be barred, or any other suitable reason when the network such as the network node 110 want to have different rules for access.

The rule related to access control that is different for UEs with different associations may e.g. comprise any one out of:

- A separate access category to be used by the low complexity first UE 121 for the access barring check, and another access category to be used by the regular second UE 122 for the access barring check, referred to as first embodiments below.
- A separate access identity to be used by the low complexity first UE 121 for the access barring check, and another access identity to be used by the regular second UE 122 for the access barring check, referred to as second embodiments below.
- A separate configuration such as a UAC configuration e.g. in SIB1 or in some other SIB, associated to and/or to be read by, the low complexity first UE 121 and a another UAC configuration e.g. in in SIB1, associated to and/or to be read by the regular second UE 122, referred to as third embodiments below.

Action 403

When initiating an access attempt to a cell e.g. in the radio communications network 100, the first UE 121 performs access barring check based on the first association and the obtained rule.

The method will now be further explained and exemplified in below embodiments. These below embodiments may be combined with any suitable embodiment as described above.

First embodiments comprising differentiated access barring for low complexity UEs using new access category.

In these embodiments, the rule related to access control that is different for UEs with different associations, comprises a separate access category to be used by the low complexity first UE 121 for the access barring check, and another access category to be used by the regular second UE 122 for the access barring check.

To allow the network, such as the radio communications network 100, to apply differentiated access barring for low complexity UEs, such as the first UE 121, and regular UEs, such as the second UE 122, access attempts triggered by the low complexity UEs, such as the first UE 121, are mapped to one or more separate access categories. In other words, to apply differentiated access barring for low complexity UEs, and regular UEs, such as the second UE 122, access attempts triggered by the low complexity UEs, are mapped to one or more separate access categories.

The access category may e.g. be a standardized access category, or an operator defined access category.

- In case a standardized access category is used, the criteria for mapping access attempts to the access category may be pre-defined in the 3GPP standard. E.g. the criteria for mapping of the access attempt to access category will be based on the device type i.e. "the association assigned to the UE". In this way all UEs with low complexity UE type will use a certain access category. The criteria may be based on the association of the UE, e.g. the device type, e.g. "low complexity UE", or a service type, e.g. MTC, related to the device type of the first UE 121. This means the first association assigned to the first UE 121, associating the first UE 121 with its low complexity type may comprise a service type relating to a low complexity UE.
- In case an operator defined access category is used, the rule such as the criteria for mapping access attempts to the access category may signaled to the UE, such as the first UE 121 and/or the second UE 122, over NAS, e.g. during initial network registration. The criteria may either be one of the existing criteria, e.g. DNN, 5QI, OS Id+OS APP Id, or S-NSSAI), or a new criteria may be defined based on the UE type (e.g. "low-complexity UE") or the service type (e.g. MTC). Note that if an existing criteria is used (e.g. S-NSSAI), the network, such as the radio communications network 100, may preferably ensure that the criteria is fulfilled for the low complexity UEs, such as the first UE 121, by e.g. assigning all low complexity UEs to the network slice represented by the S-NSSAI.

If device type is used as association, such as first association associating the first UE 121 with its low complexity type, for the access category mapping, one or more device types may preferably be defined for the low complexity UEs, such as the first UE 121. The device type may be similar to the UE category used in LTE and may be reported from the first UE 121 to the network, such as the network node 110, as part of the UE capabilities. Alternatively, the device type may be determined based on or more of the possibly reduced UE capabilities of the first UE 121, for example, the reduced UE bandwidth or reduced number of UE RX/TX antennas. In some embodiments, if a particular or a set of UE capabilities is used for the access category mapping, the capability/capabilities may be stored as part of the subscriber data in the UE, such as the first UE 121, e.g. on a Universal Subscriber Identity Module (USIM), and in the network such as e.g. the network node 110, or e.g. in an User data management (UDM) related to the network node 110. Yet another alternative is to determine the device type from the device identity, i.e. the IMEI, of the UE, such as the first UE 121.

If service type is used as association, such as first association associating the first UE 121 with its low complexity type, for the access category mapping, the service type, e.g. MTC, may be stored as part of the subscriber data in the UE such as the first UE 121, e.g. on the USIM, and in the network such as e.g. the network node 110, or e.g. in the UDM related to the network node 110. The assumption here is that UEs using an MTC type of service would typically also be low complexity UEs, such as the first UE 121.

An example according to embodiments herein, of a resulting access control procedure for low complexity UEs such as the first UE 121 is shown FIG. 5. FIG. 5 depicts an example of an access barring check for a low complexity RedCap UE such as the first UE 121 according to an example embodiment. In FIG. 5, the network node 110 is referred to as eNB 110 and may comprise or be accessible to an AMF node, referred to as AMF.

Action 201.

Operator defined rules such as access categories are configured to the first UE 121 over NAS if the operator defined access categories are used to differentiate the low complexity UEs, such as the first UE 121, e.g. via the network node 110. This action may for example be performed when the UE, such as the first UE 121, registers to the network for the first time.

Action 202.

When the first UE 121 selects a new cell for camping in RRC_IDLE/RRC_INACTIVE or when it is handed over to new cell in RRC_CONNECTED, the first UE 121 obtains SI in the new cell which includes the rule such as the UAC configuration.

The access categories and the UAC configuration may together be the rule.

To make the access barring check correct, i.e. according to the rule, the first UE 121 need to know its association, i.e. that it is a low complexity type of UE, to find out which access category it is assigned. When the first UE 121 has found out which access category it is assigned, it will follow the configuration such as the UAC configuration, according to that access category.

Action 203-204.

As mentioned above, a access barring check will be performed by the first UE 121 based on the first association and the obtained rule when initiating an access attempt to the cell.

So, in the example of FIG. 5, upon triggering of the new access attempt, the first UE 121 determines the access category and access identity i.e. the rule and the first UE's 121 association, for the access attempt. When determining the access category the first UE 121 takes its device type and/or service type, i.e. its association into consideration. The UE 121 knows its association and checks the rules, i.e. the access categories in the UAC configuration, for that association to find the correct access category to use for access barring check.

Action 205-207.

As mentioned above, upon triggering of a new access attempt the rule triggers the first UE 121 to perform access barring check based on the first association and the obtained rule when initiating an access attempt to the cell.

The first UE 121 performs a barring check for the determined access category and access identity using the UAC configuration obtained via SI. If the access barring check is successful, the first UE 121 may proceed with the access attempt. If the first UE 121 is in RRC_IDLE/RRC_INACTIVE this typically involves transitioning to RRC_CONNECTED. If the access barring check fails the first UE 121 may start a barring timer and does not attempt to access again until the barring timer expires.

In some embodiment of the above, new access categories corresponding to the 11 already existing standardized access categories in Table 1, or a subset thereof, may be defined to be able to differentiate between access attempts triggered by low complexity/MTC UEs such as the first UE 121, and regular/MBB UEs, such as the second UE 122. In these embodiments, new mapping rules may also be defined, where the requirement for the rule to be met includes an access attempt performed by the first UE 121 such as a low complexity UE or a UE using MTC service.

In one example, the rule comprises a single new defined access category, which enables the differentiation between access attempts triggered by low complexity UEs such as the first UE 121, and regular UEs, such as the second UE 122. A mapping rule when used herein may comprise the association mapped to the rule. The mapping rule may be based on or use the association, e.g. device type, assigned to the UE. For example, a mapping rule states that this new access category is to be used for all access attempts performed by a low complexity UE such as the first UE 121, except MT access, emergency or an access attempt mapped onto an operator-defined access category. And for example, this may be accomplished by assigning a corresponding rule number to the new rule, e.g. rule #3.1 referring to Table 1. Or for example, this mapping rule states that a new access category is to be used for all access attempts performed by a low complexity UE such as the first UE 121, except MT access and emergency. And for example, this may be accomplished by assigning a corresponding rule number to the new rule, e.g. rule #2.1 referring to Table 1.

In another example, a single new access category is defined, and a mapping rule states that a new access category is to be used for all access attempts triggered by certain services, e.g. used by the low complexity first UE 121, such as MTC type of services. This enables the differentiation between access attempts corresponding to certain services e.g. used by the low complexity first UE 121, such as MTC type of services, and access attempts triggered by existing services e.g. used by the regular second UE 122, such as MBB or URLLC services. For example, the mapping rule states that the new access category is used for access attempts for certain services, such as MTC type of services. Typically the rules corresponding to access attempts for MT services, emergency calls and access attempts mapped to operator-defined access categories should preferably have precedence over other rules. This is accomplished by assigning a suitable rule number to this new mapping rule, e.g. rule #3.1 referring to Table 1.

In yet another example, multiple new access categories are defined which enables the differentiation between multiple types of access attempts triggered by low complexity UEs such as the first UE 121, and regular UEs, such as the second UE 122. For example, a first new rule stating that a first new access category is used for one type of access attempt performed by a low complexity UE, except for MT access, emergency or an access attempt mapped onto an operator-defined access category. For example, a second new rule stating that a second new access category is used for another type of access attempt performed by a low complexity UE, except for MT access, emergency or an access attempt mapped onto an operator-defined access category. These new mapping rules may be assigned suitable rule numbers, e.g. rule #3.1 and rule #3.2 referring to Table 1.

In yet another example, multiple new access categories are defined which enables the differentiation between multiple types of access attempts, each corresponding to a certain service, such as MTC type of service e.g. used by the low complexity first UE 121, as well as access attempts triggered by existing services, such as MBB or URLLC services e.g. used by the regular second UE 122. For example, a first new mapping rule states that a first new access category is used for access attempts for a first type of certain service, such as MTC type of service. And for example, a second new mapping rule states that a second new access category is used for access attempts for a second type of certain service, such as MTC type of service. These new mapping rules may be assigned suitable rule numbers, e.g. rule #3.1 and rule #3.2 referring to Table 1.

In yet another example, multiple new access categories are defined which enables the differentiation between multiple types of access attempts, each corresponding to a certain (reduced) UE capability or a set of (reduced) UE capabilities e.g. to be used by the first UE 121. For example, a first new mapping rule states that UE such as the first UE 121, uses reduced bandwidth, and mapping to access category is based on access attempt from such UE, e.g. "MO signaling resulting from paging of a reduced bandwidth UE" or "MO signaling initiated from a reduced bandwidth UE", second new mapping rule for a UE, such as the first UE 121, which has reduced processing capability and so on. These new mapping rules may preferably be assigned suitable rule numbers, e.g. rule #3.1 and rule #3.2 referring to Table 1.

Note that in an all the examples above, the existing rule #3.1 ("Access attempt for MO exception data") in Table 1 may need to be renumbered when the new rules are added. For example, if a new rule #3.1 is added the old rule #3.1 may be assigned the next available number, e.g. rule #3.2. In this way we may ensure that new rule #3.1 is evaluated before the old rule #3.1. Another option is to assign the new rule a lower (unused) number, e.g. the new rule is assigned the number 3.0 instead of the number 3.1.

In another embodiment of the above, an existing access category, such as access category 1 (=delay tolerant), is used for the access attempts performed by a low complexity UE, such as the first UE 121. In one example, the existing rule #4 referring to Table 1 is modified so the requirement for the rule to be met includes an access attempt performed by a low complexity UE, such as the first UE 121. In this example, the existing access category 1 is used for all access attempts performed by a low complexity UE, such as the first UE 121, except MT access, emergency or an access attempt mapped onto an operator-defined access category.

In another example, the existing rule #4 referring to Table 1 is modified so the requirement for the rule is to be met includes an access attempt triggered by certain services, such as MTC type of services, e.g. used by the first UE 121. In this example, the existing access category 1, is used for all access attempts triggered by certain services, such as MTC type of services, except MT access, emergency or an access attempt mapped onto an operator-defined access category.

In yet another example, the existing rule #4 referring to Table 1 is modified so the requirement for the rule to be met includes an access attempt triggered by certain services, e.g. used by the first UE 121, such as MTC type of services, and by a low complexity UE, such as the first UE 121. In this example, the existing access category 1, is used for all access attempts triggered by certain services e.g. used by the first UE 121, such as machine-type communication (MTC) type of services, except MT access, emergency or an access attempt mapped onto an operator-defined access category, by a low complexity UE such as the first UE 121.

Second embodiments with differentiated access barring for low complexity UEs by using new access identity.

In these embodiments, wherein the rule related to access control that is different for UEs with different associations comprises a separate access identity to be used by the low complexity first UE 121 for the access barring check, and another access identity to be used by the regular second UE 122 for the access barring check.

In some other embodiments, barring for a UE such as the first UE 121, configured for MTC services or a low complexity UE such as the first UE 121, is achieved by defining at least one new access identity (see TS 24.501, NAS protocol for 5G System (5GS), v16.4.1, table 4.5.2.1) for this type of UEs or when the UE is configured for a particular type of service (e.g. MTC). The new access identity may make use of one of the reserved access identity identifiers 3-10, or be added as an extension to the existing set of 15 access identities. To support barring of the UEs such as the first UE 121, associated with the new access identity the uac-BarringForAccessIdentity bitmap may be extended to account also the new access identity.

The access identity, or the service and/or device type used to determine the access identity may either be stored in the UE such as the first UE 121, (e.g. on the USIM) or in the network such as the network node 110, (e.g. in the UDM). In the latter case access identity may be configured in the UE e.g. at network registration.

The original intention of the access identity is to exempt certain UEs such as the first UE 121, from access barring, i.e. if any bit corresponding to one of the UE's access identities is set to 0 in the uac-BarringForAccessIdentity bitmap the UE skips the barring check and directly proceeds with the access attempt. In other words the access identities are used to lift barring rather than impose more restrictive barring. Furthermore, regular UEs such as the second UE 122, are assigned access identity 0 but there is no bit in the bitmap corresponding to this access identity. This means that the regular UEs will always be subject to access barring. This makes it impossible to apply access barring for the low complexity/MTC but not the regular UEs even though the low complexity/MTC UEs are assigned a separate access identity.

In one embodiment the above mentioned problem is addressed by also introducing a new bit corresponding to access identity 0 in the bitmap (i.e. a bit for the regular UEs such as the second UE 122). To achieve more restrictive barring for low complexity/MTC UEs such as the first UE 121, in an overload situation, the bit for the low complexity/MTC UEs in the bitmap would be set to 1 while the bit for the regular UEs would be set to 0. In this way the low complexity/MTC UEs would be subject to access barring but not the regular UEs. Under normal operation both the bit for the low complexity/MTC UEs and the regular UEs should be set to 0 since access barring should not be applied to any UE in this case (another alternative to disable access barring is to not broadcast any UAC information at all in the cell). Note that in order for this approach to work, the low complexity/MTC UEs should not be mapped to default access identity 0 used by the regular UEs.

In another embodiment the above mentioned problem is addressed by barring all access attempts for certain access identities. This may e.g. be achieved by introducing a bitmap similar to uac-BarringForAccessIdentity where each bit corresponds to an access identity and if a bit is set to 1 all access attempts for that access identity will be barred. (Alternatively, uac-BarringForAccessIdentity may be extended with this new interpretation of the bit). By setting the bit corresponding to the low complexity/MTC UEs such as the first UE 121, to 1 it is possible to completely bar this group of UEs separately. An example of how this may be captured in the RRC specification TS 38.331, NR RRC protocol specification, v15.8.0 is shown below. The new bitmap may be referred to as called barredAccessIdentities in this example below.

5.3.14.5 Access Barring Check
The UE Shall:
1> if one or more Access Identities are indicated according to TS 24.501 [23],
   2> if for at least one of these Access Identities the corresponding bit in the barredAccessIdentities contained in "UAC barring parameter" is set to one:
      3> consider the access attempt as barred;
   2> if for at least one of these Access Identities the corresponding bit in the uac-BarringForAccessIdentity contained in "UAC barring parameter" is set to zero:
      3> consider the access attempt as allowed;
1> else:
   2> draw a random number 'rand' uniformly distributed in the range: 0≤rand<1;
   2> if 'rand' is lower than the value indicated by uac-BarringFactor included in "UAC barring parameter":
      3> consider the access attempt as allowed;
   2> else:
      3> consider the access attempt as barred;
1> if the access attempt is considered as barred:
   2> draw a random number 'rand' that is uniformly distributed in the range 0≤rand<1;
   2> start timer T390 for the Access Category with the timer value calculated as follows, using the uac-BarringTime included in "AC barring parameter":

T390=(0.7+0.6*rand)*uac-Barring Time.

In another embodiment the above mentioned problem is addressed by using the access identity to modify the access barring parameters. For example if the UE, such as the first UE 121, is assigned the association, e.g. belongs to, the low complexity/MTC access identity the barring factor or the barring factor for all access categories may be multiplied with a scaling factor, typically to make the barring more restrictive for MTC.

In another embodiment, the first association, such as the access identities are used to indicate whether the low complexity UE/MTC, such as the first UE 121, is roaming or not roaming. In one example, such access identity would be valid if the UE such as the first UE 121, is in Home Public Land Mobile Network (HPLMN) or Public Land Mobile Network (PLMN) equivalent to HPLMN or visited PLMN in the home country, in another example such identity would be valid in all other PLMNs but not in HPLMN or PLMN equivalent to HPLMN or visited PLMN in the home country. Such identities may be used to enable or disable or define different settings for low complexity/MTC UE barring in roaming scenarios, e.g. in some cases a network operator may allow such UEs to access with lower probability.

Third embodiments with differentiated access barring for low complexity UEs by broadcasting separate UAC configuration.

In these embodiments, wherein the rule related to access control that is different for UEs with different associations comprises a separate UAC configuration e.g. in SIB1 or in some other SIB, associated to and/or to be read by, the low complexity first UE 121 and a another UAC configuration e.g. in in SIB1, associated to and/or to be read by the regular second UE 122.

In some another embodiments differentiated access barring for low complexity/MTC UEs such as the first UE 121, is achieved by broadcasting a separate rule, such as a UAC configuration in SIB1 (or in some other SIB) for the low complexity/MTC UEs. Thus, regular UEs such as the second UE 122, would read the regular UAC configuration in SIB1 while the low complexity/MTC UEs would read the new UAC configuration in SIB1. In this embodiment the low complexity/MTC UEs do not need to be assigned separate access category/access identity since it possible to configure set the barring rate differently for the access categories/ access identities in the separate UAC configuration. For example, the barring factor for access category 7 ("MO-_data") may be set to 0.95 (5 percent of the access attempts are barred) in the regular UAC configuration and to 0 (100 percent of the access attempts are barred) in the new UAC configuration. Broadcasting a separate UAC configuration gives full flexibility but comes at the price of increased broadcasting overhead.

Other Access Control Mechanisms for Low Complexity UEs

There are also other ways to reduce the traffic load generated by the low complexity UEs such as the first UE 121, besides access barring. One is to de-prioritize the low complexity UEs during random access and the other one is to reject/release RRC connections established by low complexity UEs. These two options are described further in the next sections.

De-Prioritizing Low Complexity UEs Such as the First UE 121, During Random Access A random access procedure is, apart for the UAC part, unaffected both by which service the UE is trying to set up or what type of device the UE is. Here some embodiments are presented for differentiating the low complexity UEs such as the first UE 121, during the random access procedure.

In one embodiment, a new RA de-prioritization would be introduced for low complexity UEs e.g. the first UE 121, such that low complexity UEs or UEs using MTC service would need to apply longer RA back-off time and/or small power ramping steps compared to regular NR UEs. This may for example be implemented in RRC spec TS 38.331, NR RRC protocol specification, v15.8.0 as follows:

RA-Prioritization

The IE RA-Prioritization is used to configure prioritized random access.

RA-Prioritization Information Element

ASN1START
TAG-RA-PRIORITIZATION-START
RA-Prioritization:=SEQUENCE {powerRampingStepHighPriority ENUMERATED {dB0, dB2, dB4, dB6}, scalingFactorBI ENUMERATED {zero, dot25, dot5, dot75} OPTIONAL,
Need R.
}
TAG-RA-PRIORITIZATION-STOP
ASN1STOP In this case the 3GPP Release 17 versions of the IEs would be configured for low complexity UEs such as the first UE 121, and override the legacy IEs if configured. RA-prioritization is in Rel-15 NR applied for beam failure recovery and for contention-free random access, so in the embodiment above any prioritization for these cases may not be achieved for low complexity UEs if this is configured. But the advantage is that no new procedure changes would have to be introduced in MAC specification TS 38.321, NR MAC protocol specification, v15.8.0.

In an alternative embodiment, a new IE scalingFactorBI-RedCap would be introduced in RRC specification TS 38.331, NR RRC protocol specification, v15.8.0 and configured for low complexity UEs such as the first UE 121, which would be added on top of the existing scaling factor in MAC specification TS 38.321, NR MAC protocol specification, v15.8.0 (and vice versa for the power ramping). E.g. in the following way where the default value of SCALING_FACTOR_BI_REDCAP would be 1 if not configured:

2> if the Random Access Response contains a MAC subPDU with Backoff Indicator:
  3> set the PREAMBLE_BACKOFF to value of the BI field of the MAC subPDU using Table 7.2-1, multiplied with SCALING_FACTOR_BI and with SCALING_FACTOR_BI_REDCAP.

An alternative embodiment of the above would be to have a different interpretation of scaling of the BI field for low complexity UEs such as the first UE 121, by default. E.g. x2 or x4 the value in the BI field is applied for low complexity UEs, which would be the same thing as a fixed scaling factor SCALING_FACTOR_BI_REDCAP implicitly used.

In yet an alternative embodiment, a new offset may be configured to be added to the backoff time for low complexity UEs such as the first UE 121, (the default value of RedCap_Backoff_Offset would be 0 ms, i.e. when not configured), ensuring regular regular UEs such as the second UE 122 would have an advantage:

2> if the Random Access procedure is not completed:
  3> select a random backoff time according to a uniform distribution between 0 and the PREAMBLE- _BACKOFF, or according to a uniform distribution between 0 and the PREAMBLE_BACKOFF plus RedCap_Backoff_Offset;

In Rel-15 MAC specification TS 38.321, NR MAC protocol specification, v15.8.0, the random access backoff time, PREAMBLE_BACKOFF, is only incremented from the default value of 0 ms in case of a MAC subPDU with the BI field set is received in the RAR window, which would typically be the case only upon preamble collision and congestion. Note that the last embodiment would still increase the back-off time, i.e. even if nothing was received during the RAR window, since RedCap_Backoff_Offset is added to the PREAMBLE_BACKOFF.

In yet an alternative embodiment, the default value for the backoff is modified for low complexity UEs such as the first UE 121, to be larger than 0 ms. E.g.:

2> else:
3> set the PREAMBLE_BACKOFF to 0 ms, or to X ms if the UE is a low complexity UE.

The RA de-prioritization mechanism described above is not limited to UEs in RRC_CONNECTED mode but may also be applied by UEs in RRC_IDLE/RRC_INACTIVE. To enable this, the RA de-prioritization parameters described above (power ramping step, BI scaling factor, backoff offset, etc) may be configured via SI instead of via dedicated signaling. Another option is to use configure the parameters via dedicated signaling and specify an area over which the parameters remain valid (e.g. list of cells or tracking area).

Rejecting/Releasing Low Complexity UEs Such as the First UE 121

Another option to reduce the load from low complexity UEs, such as the first UE 121, is to reject/release RRC connections established by the low complexity UEs. In one embodiment new cause values for low complexity are added to the existing ones in establishmentCause for RRCSetupRequest, in reestablishmentCause for RRCReestablishmentRequest, and in resumeCause for RRCResumeRequest. The gNB such as the network node 110, may then base its decision on how to treat the UE, such as the first UE 121, e.g. reject/release the RRC connection, configure the waitTime, etc. based also on this information.

In another embodiment the new cause values do not directly differentiate between UE types such as the such as the low complexity first UE 121, and the regular second UE 122, but instead indicates service type or reason for (re-) establishment or resume request which would be used by low complexity or reduced capability UEs such as the first UE 121. Such value may be specific to low complexity UEs, or more general allowing other UE types to use the value as well.

In another embodiment, for some procedures existing cause values would be used whereas other procedures would use new values. For example, there are number of spare values available for establishment and resume cause in RRCSetupRequest and RRCResumeRequest, respectively, but only one spare for re-establishment request in RRCReestablishmentRequest. Thus, for re-establishment the UE attempt may be mapped to existing value, e.g. "otherFailure", whereas for new access attempts for resume and setup, a new value would be defined indicating either UE type or a specific service type used by low complexity UEs such as the first UE 121.

In an alternative embodiment of the above, a new 1-bit low complexity UE indication such as first association is assigned to the first UE 121, may instead be added to the RRC messages (RRCSetupRequest, RRCReestablishmentRequest, RRCResumeRequest, etc.) to obtain the same differentiation.

In yet an alternative embodiment, the same differentiated treatment may be achieved, not based on explicit information from the UE, but rather on CN information. E.g. based on low complexity information stored with the UE subscription profile of the UE such as the first UE 121.

Figure 6A:
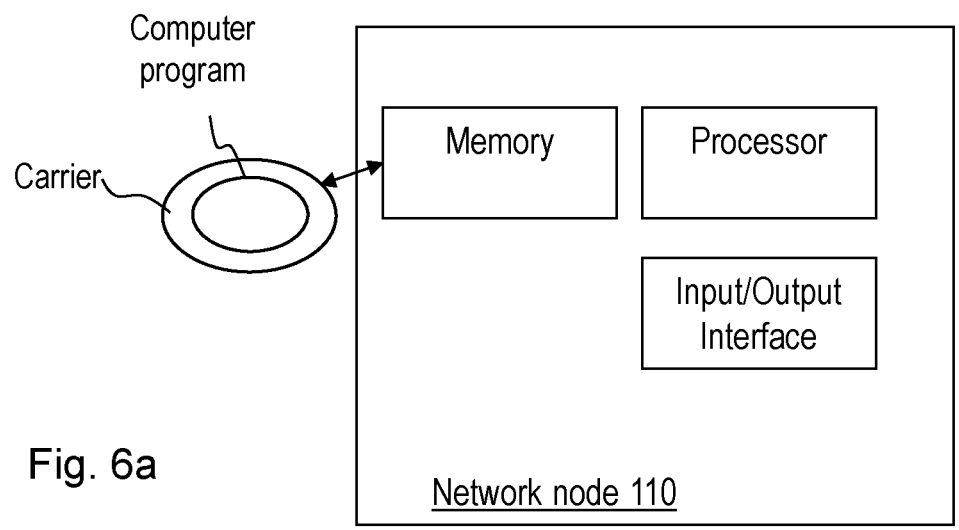
FIG. 6 a and b are schematic block diagrams illustrating embodiments of a network node.
Figure 6B:
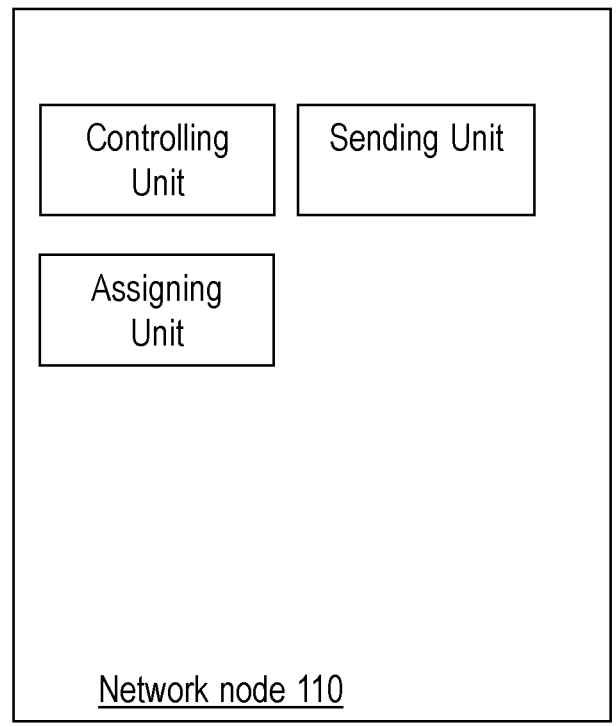

FIGS. 6a and 6b shows an example of arrangement in the network node 110. The network node 110 may comprise a controlling unit, a sending unit and an assigning unit to perform the method actions as described herein, see FIG. 6b.

Figure 7A:
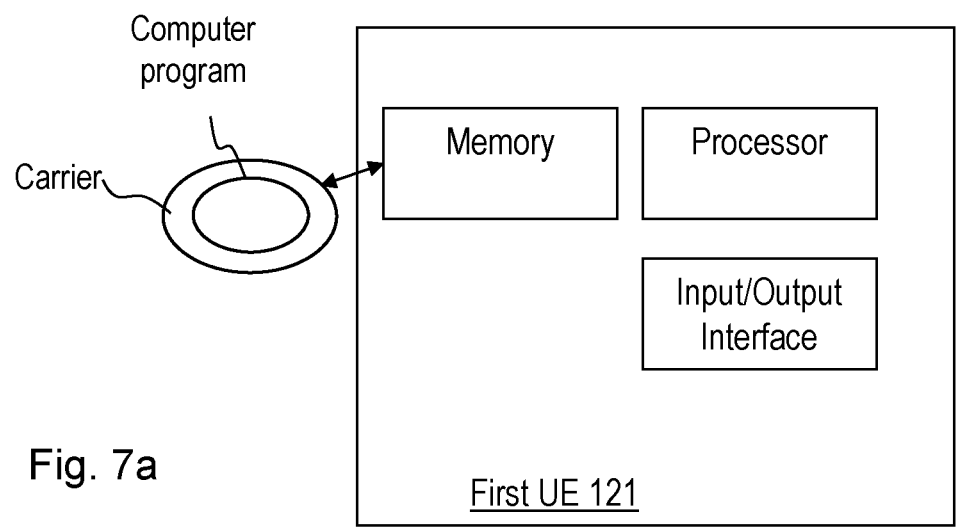
FIG. 7 a and b are schematic block diagrams illustrating embodiments of a UE.
Figure 7B:
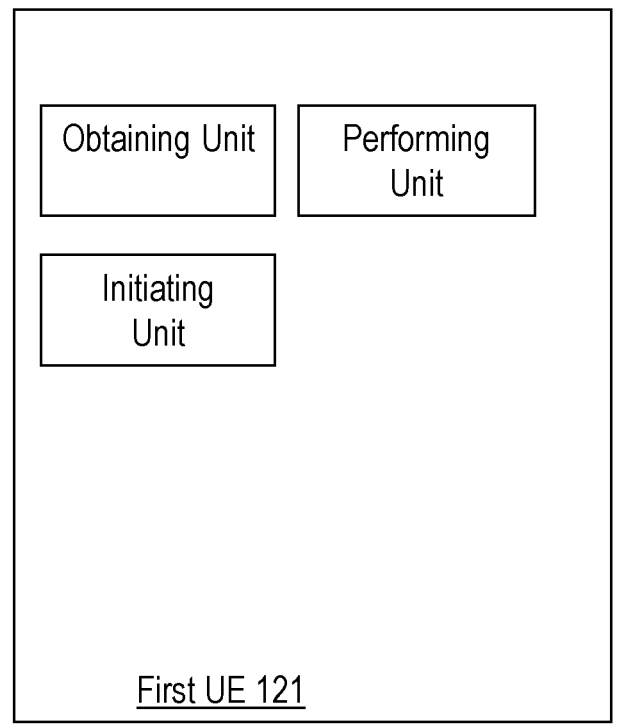

FIGS. 7a and 7b shows an example of arrangement in the first UE 121. The first UE 121 may comprise an obtaining unit, a performing unit and an initiating unit to perform the method actions as described herein, see FIG. 7b.

The network node 110 and the first UE 121 may comprise a respective input and output interface configured to communicate with each other, see FIGS. 6a and 7a. The input and output interface may comprise a wireless receiver (not shown) and a wireless transmitter (not shown).

The embodiments herein may be implemented through a respective processor or one or more processors, such as the respective processor of a processing circuitry in the respective network node 110 and first UE 121, depicted in FIGS. 6a and 7a, together with computer program code for performing the functions and actions of the embodiments herein. The program code mentioned above may also be provided as a computer program product, for instance in the form of a data carrier carrying computer program code for performing the embodiments herein when being loaded into the respective network node 110 and first UE 121. One such carrier may be in the form of a CD ROM disc. It is however feasible with other data carriers such as a memory stick. The computer program code may furthermore be provided as pure program code on a server and downloaded to the respective network node 110 and first UE 121.

The network node 110 and the first UE 121 may further comprise a respective memory comprising one or more memory units. The respective memory comprises instructions executable by the processor in the respective network node 110 and the first UE 121.

The respective memory is arranged to be used to store associations, rules, instructions, data, configurations, and applications to perform the methods herein when being executed in the respective network node 110 and first UE 121.

In some embodiments, a respective computer program comprises instructions, which when executed by the at least one processor, cause the at least one processor of the respective network node 110 and first UE 121 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the respective network node 110 and first UE 121, described below may refer to a combination of analog and digital circuits, and/or one or more processors configured with software and/or firmware, e.g. stored in the respective network node 110 and first UE 121, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Below, some example embodiments 1-16 are shortly described. See e.g. FIGS. 2, 3, 4, 6a, 6b, 7a and 7b.

Embodiment 1. A method performed by a network node 110, e.g. for controlling access of a first User Equipment, UE, 121 and a second UE 122 to a cell in a radio communications network 100,
  wherein the first UE 121 is of a low complexity type e.g. using reduced capabilities, which reduced capabilities relate to reduced capabilities for communication in the radio communications network 100, e.g. an MTC device, V2X device, an MBB device, and wherein the second UE 122 is of a regular type, and
  wherein a first association is assigned to the first UE 121, which first association associates the first UE 121 with its low complexity type, which first association e.g. is anyone out of: an access category, an access identity, a service type, a low complexity type indication, and wherein a second association is assigned to the second UE 122, which second association associates the second UE 122 with its regular type, which second association e.g. is anyone out of: one or more access categories, an access identity, a regular type indication, the method comprising any one or more out of:
  controlling 302 access of the first UE 121 and second UE 122 by sending to the first UE 121 and second UE 122, a rule e.g. a configuration, related to access control that is different for UEs with different associations e.g. low complexity first UEs 121 and regular second UEs 122, for accessing to the radio communications network 100,
  which rule triggers the first UE 121 to perform access barring check based on the first association and the obtained rule when initiating an access attempt to a cell, e.g. in the radio communications network 100, while the second UE 122 performs access barring check based on the second association and the obtained rule.

Embodiment 2. The method according to claim 1, wherein the controlling 302 access of the first UE 121 and second UE 122 by sending to the first UE 121 and second UE 122, comprises:
  sending the rule to the first UE 121 and second UE 122 when any one or more out of:
    the radio communications network 100 is overloaded,
    when needed to prioritize a regular second UE 122 which e.g. uses MBB and URLLC applications, over the low complexity first UE 121 which e.g. uses MTC applications.
    when the amount of traffic and signaling, generated by the low complexity UEs need to be barred.

Embodiment 3. The method according to any of the claims 1-2, wherein the rule related to access control that is different for UEs with different associations comprises any one out of:
  a separate access category to be used by the low complexity first UE 121 for the access barring check, and another access category to be used by the regular second UE 122 for the access barring check.
  a separate access identity to be used by the low complexity first UE 121 for the access barring check, and another access identity to be used by the regular second UE 122 for the access barring check.
  a separate configuration such as a UAC configuration e.g. in SIB1 or in some other SIB, associated to and/or to be read by, the low complexity first UE 121 and a another UAC configuration e.g. in in SIB1, associated to and/or to be read by the regular second UE 122.

Embodiment 4. A computer program comprising instructions, which when executed by a processor, causes the processor to perform actions according to any of the claims 1-3.

Embodiment 5. A carrier comprising the computer program of claim 4, wherein the carrier is one of an electronic signal, an optical signal, an electromagnetic signal, a magnetic signal, an electric signal, a radio signal, a microwave signal, or a computer-readable storage medium.

Embodiment 6. A method performed by a first User Equipment, UE, 121 e.g. for handling access to a cell in a radio communications network 100, wherein the first UE 121 is of a low complexity type e.g. using reduced capabilities, which reduced capabilities relate to reduced capabilities for communication in the radio communications network 100, e.g. an MTC device, a V2X device, an MBB device, the method comprising any one or more out of:
  obtaining 401 a first association, assigned to the first UE 121, which association associates the first UE 121 with low complexity type, e.g. which association is any one out of: an access category, an access identity, a low complexity type indication,
  obtaining 402 a rule e.g. a configuration, related to access control for UEs with different associations e.g. low complexity first UEs 121 and regular second UEs 122, for accessing to the radio communications network 100,
  when initiating an access attempt to a cell e.g. in the radio communications network 100, performing 403 access barring check based on the first association and the obtained rule.

Embodiment 7. The method according to claim 6, wherein the rule is obtained when any one or more out of:
  the radio communications network 100 is overloaded,
  when needed to prioritize a regular second UE 122 which e.g. uses MBB and URLLC applications, over the low complexity first UE 121 which e.g. uses MTC applications.
  when the amount of traffic and signaling, generated by the low complexity UEs need to be barred.

Embodiment 8. The method according to any of the claims 6-7, wherein the rule related to access control that is different for UEs with different associations comprises any one out of:
  a separate access category to be used by the low complexity first UE 121 for the access barring check, and another access category to be used by the regular second UE 122 for the access barring check.
  a separate access identity to be used by the low complexity first UE 121 for the access barring check, and another access identity to be used by the regular second UE 122 for the access barring check.
  a separate configuration such as a UAC configuration e.g. in SIB1 or in some other SIB, associated to and/or to be read by, the low complexity first UE 121 and a another UAC configuration e.g. in in SIB1, associated to and/or to be read by the regular second UE 122.

Embodiment 9. A computer program comprising instructions, which when executed by a processor, causes the processor to perform actions according to any of the claims 6-8.

Embodiment 10. A carrier comprising the computer program of claim 9, wherein the carrier is one of an electronic signal, an optical signal, an electromagnetic signal, a magnetic signal, an electric signal, a radio signal, a microwave signal, or a computer-readable storage medium.

Embodiment 11. A network node 110, e.g. configured to control access of a first User Equipment, UE, 121 and a second UE 122 to a cell in radio communications network 100,
- wherein the first UE 121 is adapted to be of a low complexity type e.g. using reduced capabilities, which reduced capabilities are adapted to relate to reduced capabilities for communication in the radio communications network 100, e.g. an MTC device, V2X device, an MBB device, and wherein the second UE 122 is adapted to be of a regular type, and
- wherein a first association is adapted to be assigned to the first UE 121, which first association further is adapted to associate the first UE 121 with its low complexity type, which first association e.g. is anyone out of: an access category, a service type, an access identity, a low complexity type indication, and wherein a second association is adapted to be assigned to the second UE 122, which second association further is adapted to associate the second UE 122 with its regular type, which second association e.g. is anyone out of: one or more access categories, an access identity, a regular type indication, the network node 110 being further configured to any one or more out of:
- control, e.g. by means of a controlling unit in the network node 110, access of the first UE 121 and second UE 122 by sending to the first UE 121 and second UE 122, a rule e.g. a configuration, adapted to relate to access control that is different for UEs with different associations e.g. low complexity first UEs 121 and regular second UEs 122, for accessing to the radio communications network 100,
- which rule is adapted to trigger the first UE 121 to perform access barring check based on the first association and the obtained rule when initiating an access attempt to a cell, e.g. in the radio communications network 100, while the second UE 122 performs access barring check based on the second association and the obtained rule.

Embodiment 12. The network node 110 according to claim 11, further being configured to control access of the first UE 121 and second UE 122 by sending the rule to the first UE 121 and second UE 122 when any one or more out of:
- the radio communications network 100 is overloaded,
- when needed to prioritize an regular second UE 122 which e.g. is adapted to use MBB and URLLC applications, over the low complexity first UE 121 which e.g. uses MTC applications.
- when the amount of traffic and signaling, generated by the low complexity UEs need to be barred.

Embodiment 13. The network node 110 according to any of the claims 11-12, wherein the rule adapted to relate to access control that is different for UEs with different associations further is adapted to comprise any one out of:
- a separate access category adapted to be used by the low complexity first UE 121 for the access barring check, and another access category adapted to be used by the regular second UE 122 for the access barring check.
- a separate access identity adapted to be used by the low complexity first UE 121 for the access barring check, and another access identity adapted to be used by the regular second UE 122 for the access barring check.
- a separate configuration such as a UAC configuration e.g. in SIB1 or in some other SIB, adapted to be associated to and/or adapted to be read by, the low complexity first UE 121 and a another UAC configuration e.g. in in SIB1, adapted to be associated to and/or adapted to be read by the regular second UE 122.

Embodiment 14. A first User Equipment, UE, 121 e.g. configured to handle access to a cell in a radio communications network 100, wherein the first UE 121 is of a low complexity type e.g. using reduced capabilities, which reduced capabilities are adapted to relate to reduced capabilities for communication in the radio communications network 100, e.g. an MTC device, a V2X device, an MBB device, the UE 121 being further configured to any one or more out of:
- obtain, e.g. by means of an obtaining unit in the UE 121, a first association, assigned to the first UE 121, which association is adapted to associates the first UE 121 with low complexity type, e.g. which association is further adapted to be any one out of: an access category, an access identity, a low complexity type indication,
- obtain, e.g. by means of the obtaining unit in the UE 121, a rule e.g. a configuration, related to access control for UEs with different associations e.g. low complexity first UEs 121 and regular second UEs 122, for access to the radio communications network 100, and
- when initiating an access attempt to a cell e.g. in the radio communications network 100, perform, e.g. by means of a performing unit in the UE 121, access barring check based on the first association and the obtained rule.

Embodiment 15. The first UE 121 according to claim 14, wherein the rule is adapted to be obtained when any one or more out of:
- the radio communications network 100 is overloaded,
- when needed to prioritize an regular second UE 122 which e.g. is adapted to use MBB and URLLC applications, over the low complexity first UE 121 which e.g. is adapted to use MTC applications.
- when the amount of traffic and signaling, generated by the low complexity UEs need to be barred.

Embodiment 16. The first UE 121 according to any of the claims 14-15, wherein the rule adapted to relate to access control that is different for UEs with different associations further is adapted to comprise any one out of:
- a separate access category adapted to be used by the low complexity first UE 121 for the access barring check, and another access category adapted to be used by the regular second UE 122 for the access barring check.
- a separate access identity adapted to be used by the low complexity first UE 121 for the access barring check, and another access identity adapted to be used by the regular second UE 122 for the access barring check.
- a separate configuration such as a UAC configuration e.g. in SIB1 or in some other SIB, adapted to be associated to and/or adapted to be read by, the low complexity first UE 121 and a another UAC configuration e.g. in in SIB1, adapted to be associated to and/or adapted to be read by the regular second UE 122.

Further Extensions and Variations

Figure 8:
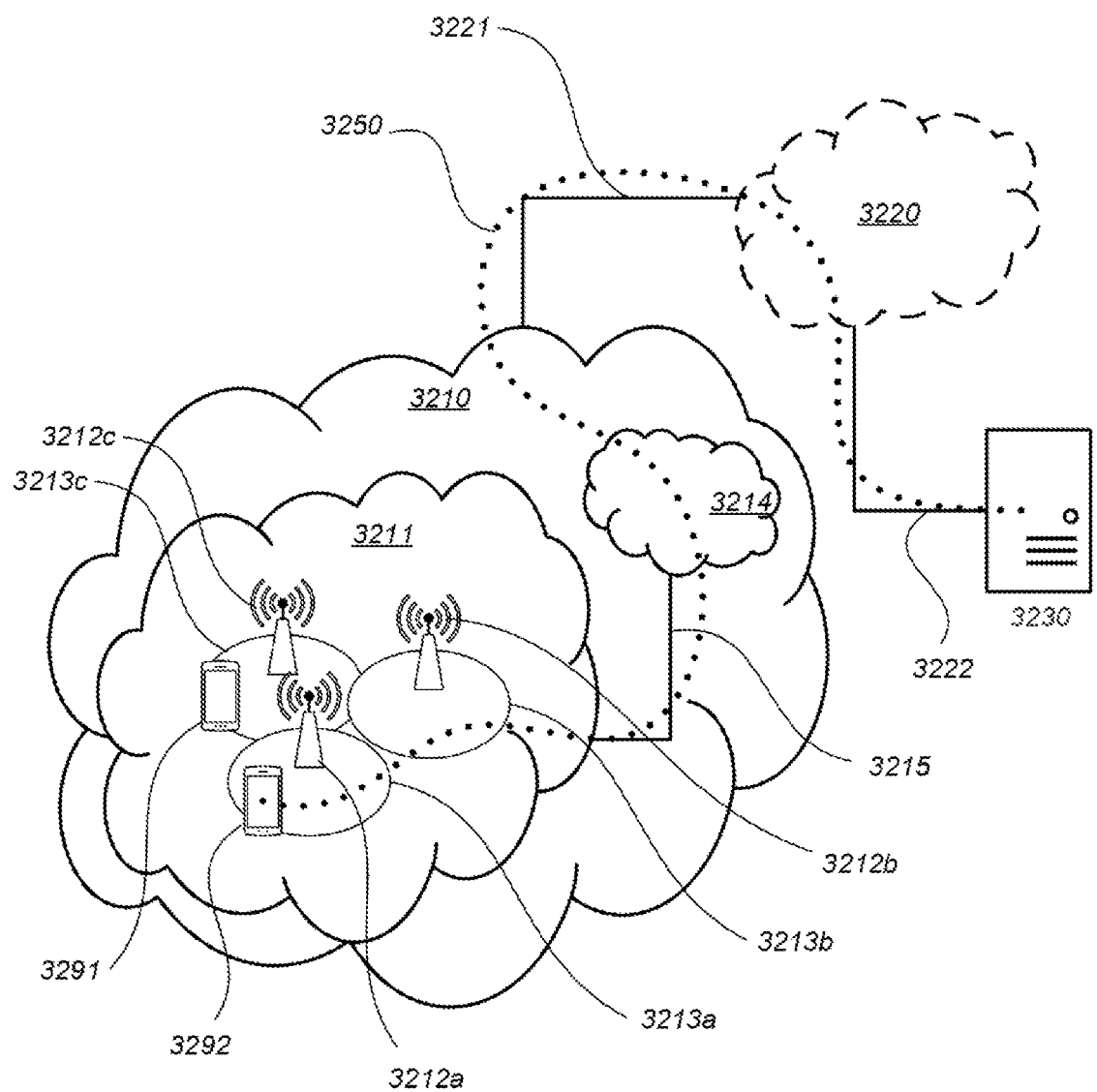
FIG. 8 schematically illustrates a telecommunication network connected via an intermediate network to a host computer.

With reference to FIG. 8, in accordance with an embodiment, a communication system includes a telecommunication network 3210 such as the radio communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the first UE 121, such as a Non-AP STA 3291 located in coverage area 3213c is configured to wirelessly connect to, or be paged by, the corresponding base station 3212c. A second UE 3292 e.g. the second UE 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

Figures 10, 11:
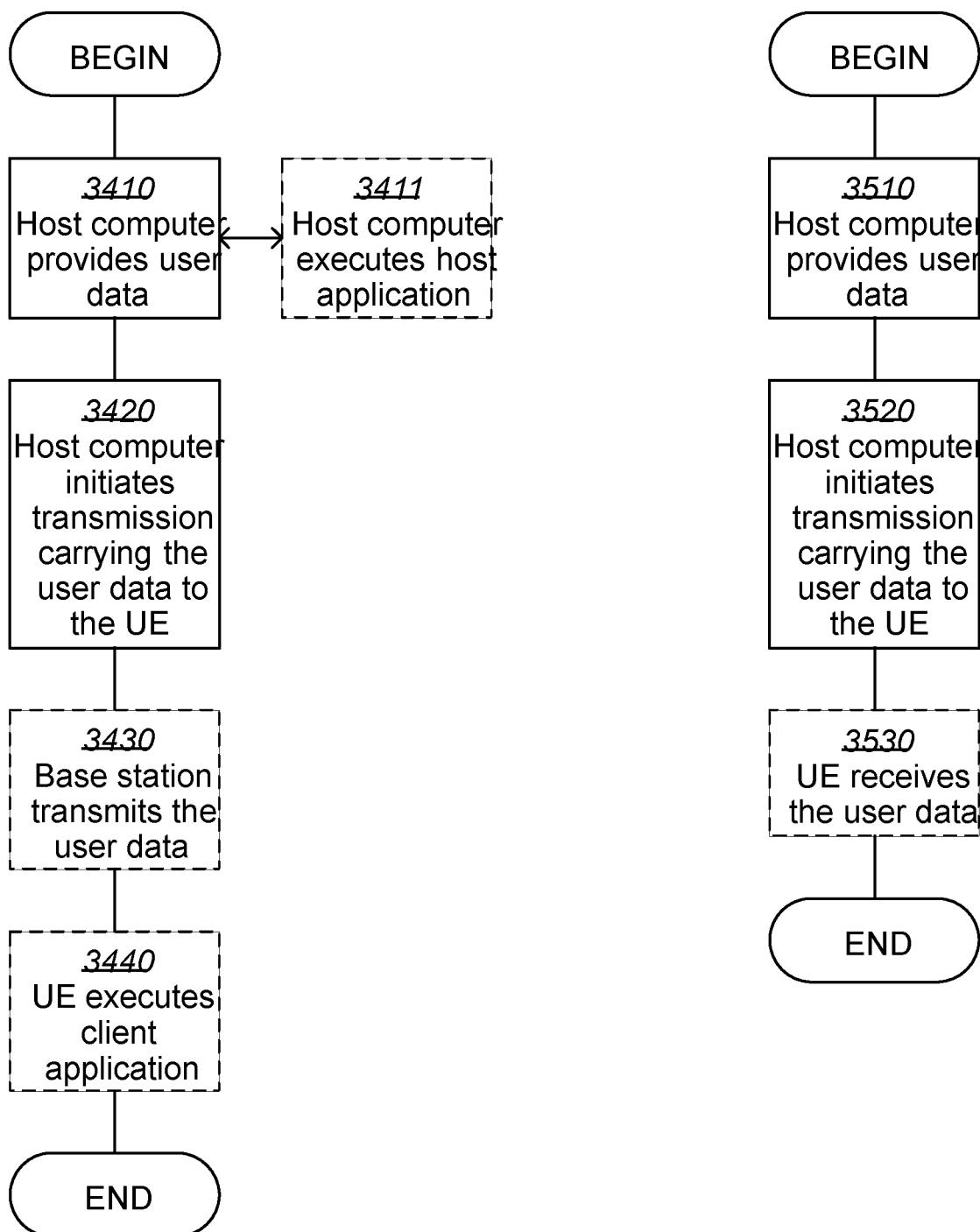

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
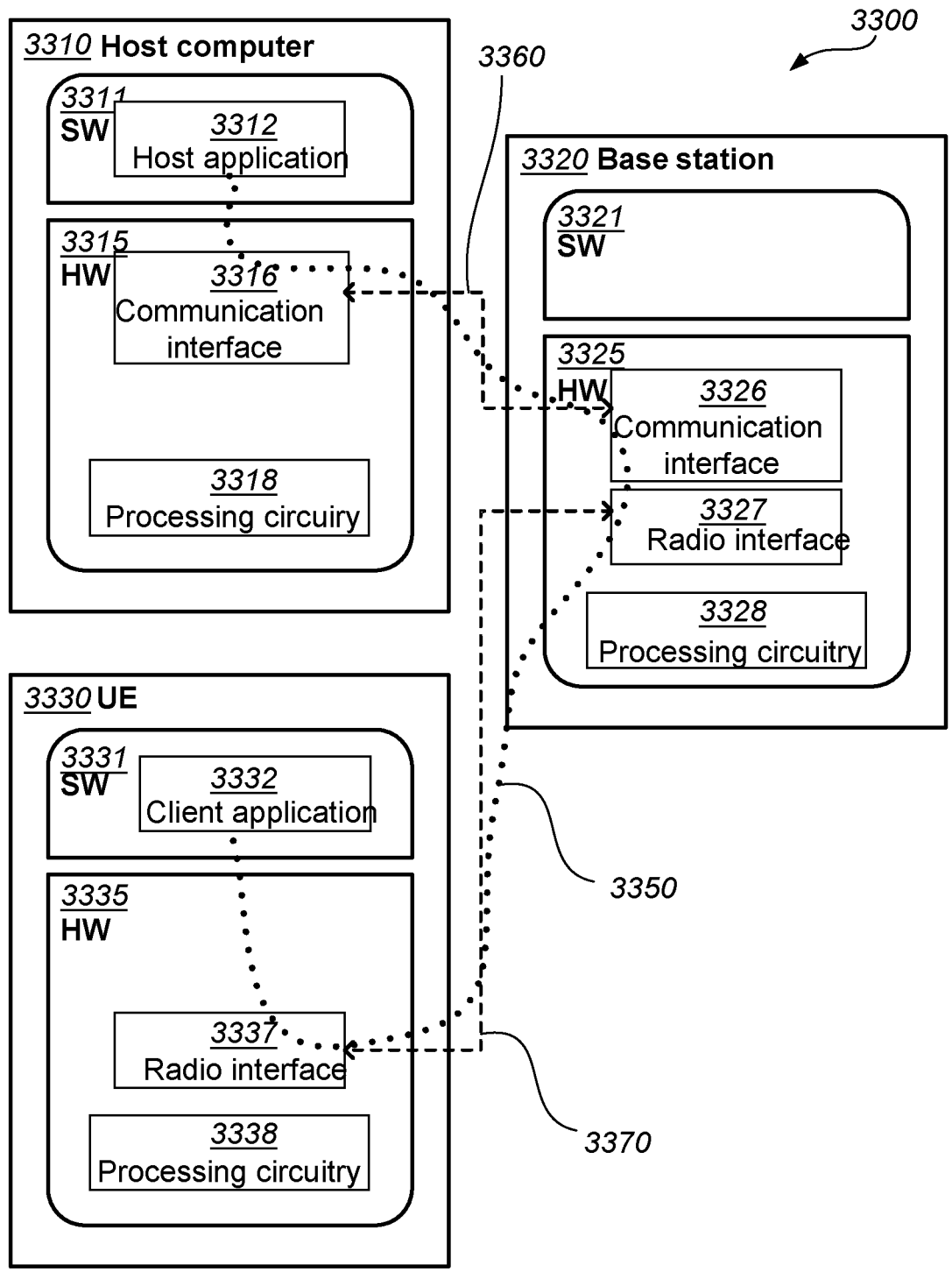
FIG. 9 is a generalized block diagram of a host computer communicating via a base station with a user equipment over a partially wireless connection.

It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 10, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station such as the network node 110, and a UE such as the UE 120, which may be those described with reference to FIG. 8 and FIG. 9. For simplicity of the present disclosure, only drawing references to FIG. 10 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 11 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 12 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 13 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a network node, for controlling access of a first User Equipment (UE) and a second UE to a cell in a radio communications network, wherein the first UE is of a low complexity type, and wherein the second UE is of a regular type, and wherein a first association is assigned to the first UE, which first association associates the first UE with its low complexity type, and wherein a second association is assigned to the second UE, which second association associates the second UE with its regular type, the method comprising:
controlling access of the first UE and second UE by sending, to the first UE and second UE, a rule related to access control that is different for UEs with different associations, for accessing to the radio communications network, the different associations comprising low complexity first UEs and regular second UEs, the first association comprising an offset that is added to a backoff time, and BI scaling factor and power ramping steps, for UEs of a low complexity type,
which rule triggers the first UE to perform access barring check based on the first association and the rule when initiating an access attempt to the cell, and triggers the second UE to perform access barring check based on the second association and the rule when initiating an access attempt to the cell.

2. The method according to claim 1, wherein the controlling access of the first UE and second UE comprises:
sending the rule to the first UE and second UE when any one or more out of:
the radio communications network is overloaded;
needed to prioritize a regular second UE, over the low complexity first UE; and
the amount of traffic and signalling generated by the low complexity UEs needs to be barred.

3. The method according to claim 1, wherein the rule related to access control that is different for UEs with different associations comprises any one out of:
a separate access category to be used by the low complexity first UE for the access barring check, and another access category to be used by the regular second UE for the access barring check;
a separate access identity to be used by the low complexity first UE for the access barring check, and another access identity to be used by the regular second UE for the access barring check; or
a separate configuration associated to and/or to be read by the low complexity first UE and another Unified Access Control (UAC) configuration associated to, and/or to be read by, the regular second UE.

4. The method according to claim 1, wherein the low complexity type comprises a type using reduced capabilities for communication in the radio communications network.

5. The method according to claim 1, wherein any one or more out of:
the first association is anyone out of: an access category, a service type, an access identity, or a low complexity type indication, and
the second association is anyone out of: one or more access categories, an access identity, or a regular type indication.

6. A method performed by a first User Equipment (UE) for handling access to a cell in a radio communications network, wherein the first UE is of a low complexity type, the method comprising:
obtaining a first association, assigned to the first UE, which association associates the first UE with low complexity type, the first association comprising an offset that is added to a backoff time, and BI scaling factor and power ramping steps, for UEs of a low complexity type,
obtaining a rule related to access control for UEs with different associations for accessing to the radio communications network, wherein the different associations comprise low complexity first UEs and regular second UEs,
when initiating an access attempt to the cell, performing access barring check based on the first association and the obtained rule.

7. The method according to claim 6, wherein the rule is obtained when any one or more out of:
the radio communications network is overloaded,
when needed to prioritize a regular second UE, over the low complexity first UE,
when the amount of traffic and signalling, generated by the low complexity UEs need to be barred.

8. The method according to claim 6, wherein the rule related to access control that is different for UEs with different associations comprises any one out of:
a separate access category to be used by the low complexity first UE for the access barring check, and another access category to be used by the regular second UE for the access barring check,
a separate access identity to be used by the low complexity first UE for the access barring check, and another access identity to be used by the regular second UE for the access barring check, or
a separate configuration associated to and/or to be read by the low complexity first UE and another UAC configuration associated to and/or to be read by the regular second UE.

9. The method according to claim 6, wherein the low complexity type comprises a type using reduced capabilities for communication in the radio communications network.

10. The method according to claim 6, wherein the first association is anyone out of: an access category, a service type, an access identity, a low complexity type indication.

11. A network node configured to control access of a first User Equipment (UE) and a second UE to a cell in a radio communications network, wherein the first UE is adapted to be of a low complexity type, and wherein the second UE is adapted to be of a regular type, and wherein a first association is adapted to be assigned to the first UE, which first association further is adapted to associate the first UE with its low complexity type, and wherein a second association is adapted to be assigned to the second UE, which second association further is adapted to associate the second UE with its regular type, the network node comprising processing circuitry configured to:
control access of the first UE and second UE by sending, to the first UE and second UE, a rule related to access control that is different for UEs with different associations, for accessing to the radio communications network, the different associations comprising low complexity first UEs and regular second UEs, the first association comprising an offset that is added to a backoff time, and BI scaling factor and power ramping steps, for UEs of a low complexity type, which rule triggers the first UE to perform access barring check based on the first association and the rule when initiating an access attempt to the cell, and triggers the second UE to perform access barring check based on the second association and the rule when initiating an access attempt to the cell.

12. The network node according to claim 11, the processing circuitry further being configured to control access of the first UE and second UE by sending the rule to the first UE and second UE when any one or more out of:
the radio communications network is overloaded,
needed to prioritize a regular second UE, over the low complexity first UE,
the amount of traffic and signalling, generated by the low complexity UEs, needs to be barred.

13. The network node according to claim 11, wherein the rule comprises any one out of:
a separate access category to be used by the low complexity first UE for the access barring check, and another access category to be used by the regular second UE for the access barring check;
a separate access identity to be used by the low complexity first UE for the access barring check, and another access identity to be used by the regular second UE for the access barring check; or
a separate configuration to be associated to and/or adapted to be read by the low complexity first UE and another Unified Access Control (UAC) configuration to be associated to and/or read by the regular second UE.

14. The network node according to claim 11, wherein the low complexity type is a type using reduced capabilities for communication in the radio communications network.

15. The network node according to claim 11, wherein any one or more out of:
the first association is anyone out of: an access category, a service type, an access identity, or a low complexity type indication; and
the second association is any one out of: one or more access categories, an access identity, or a regular type indication.

16. A first User Equipment (UE) configured to handle access to a cell in a radio communications network, wherein the first UE is of a low complexity type, the first UE being comprising processing circuitry configured to:
obtain a first association, assigned to the first UE, which first association associates the first UE with low complexity type, the first association comprising an offset that is added to a backoff time, and BI scaling factor and power ramping steps, for UEs of a low complexity type;
obtain a rule related to access control for UEs with different associations for access to the radio communications network, wherein the different associations comprise low complexity first UEs and regular second UEs; and
when initiating an access attempt to the cell, perform access barring check based on the first association and the obtained rule.

17. The first UE according to claim 16, wherein the processing circuitry is configured to obtain the rule when any one or more out of:
the radio communications network is overloaded;
needed to prioritize a regular second UE, over the low complexity first UE; or
the amount of traffic and signalling, generated by the low complexity UEs, needs to be barred.

18. The first UE according to claim 16, wherein the rule comprises any one out of:
a separate access category to be used by the low complexity first UE for the access barring check, and another access category to be used by the regular second UE for the access barring check;
a separate access identity to be used by the low complexity first UE for the access barring check, and another access identity to be used by the regular second UE for the access barring check; or
a separate configuration to be associated to and/or be read by the low complexity first UE and another Unified Access Control (UAC) configuration to be associated to and/or read by the regular second UE.

19. The first UE according to claim 16, wherein the low complexity type comprises a type using reduced capabilities for communication in the radio communications network.

20. The first UE according to claim 16, wherein the first association is any one out of: an access category, a service type, an access identity, or a low complexity type indication.

21. A non-transitory computer-readable storage medium on which is stored instructions that, when executed by a processor of a network node, causes the network node to control access of a first User Equipment (UE) and a second UE to a cell in a radio communications network, wherein the first UE is of a low complexity type, and wherein the second UE is of a regular type, and wherein a first association is assigned to the first UE, which first association associates the first UE with its low complexity type, and wherein a second association is assigned to the second UE, which second association associates the second UE with its regular type, wherein the instructions cause the network node to:
control access of the first UE and second UE by sending, to the first UE and second UE, a rule related to access control that is different for UEs with different associations, for accessing to the radio communications network, the different associations comprising low complexity first UEs and regular second UEs, the first association comprising an offset that is added to a backoff time, and BI scaling factor and power ramping steps, for UEs of a low complexity type,
which rule triggers the first UE to perform access barring check based on the first association and the rule when initiating an access attempt to the cell, and triggers the second UE to perform access barring check based on the second association and the rule when initiating an access attempt to the cell.

22. A non-transitory computer-readable storage medium on which is stored instructions that, when executed by a processor of a first User Equipment (UE) of a low complexity type, to handle access to a cell in a radio communications network, wherein the instructions cause the first UE to:
obtain a first association, assigned to the first UE, which association associates the first UE with low complexity type, the first association comprising an offset that is added to a backoff time, and BI scaling factor and power ramping steps, for UEs of a low complexity type;
obtain a rule related to access control for UEs with different associations for accessing to the radio communications network, wherein the different associations comprise low complexity first UEs and regular second UEs; and
when initiating an access attempt to the cell, perform access barring check based on the first association and the obtained rule.

* * * * *